(12) United States Patent
Sumrall

(10) Patent No.: US 6,302,138 B1
(45) Date of Patent: *Oct. 16, 2001

(54) PRESSURE REGULATING TIRE VALVE AND CORE

(75) Inventor: Dirk Lee Sumrall, Austin, TX (US)

(73) Assignee: Sumnett Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,167

(22) Filed: May 3, 2000

Related U.S. Application Data

(63) Continuation-in-part of application No. 09/422,089, filed on Oct. 21, 1999.
(60) Provisional application No. 60/105,471, filed on Oct. 23, 1998, now abandoned.

(51) Int. Cl.$^7$ .................................................. F16K 15/20
(52) U.S. Cl. ........................ 137/226; 137/493.9; 152/415
(58) Field of Search ................................ 137/226, 493.6, 137/224, 228, 234.5; 152/415

(56) References Cited

U.S. PATENT DOCUMENTS

| 1,255,411 | * | 2/1918 | Greenwald | 137/234.5 |
| 1,590,141 | | 6/1926 | Weaver . | |
| 1,991,974 | * | 2/1935 | Broecker | 137/234.5 |
| 2,569,120 | | 9/1951 | Heuve et al. . | |
| 3,561,467 | * | 2/1971 | Lutz | 137/234.5 |
| 3,592,218 | | 7/1971 | Guy et al. | 137/227 |
| 3,712,328 | * | 1/1973 | McAnally | 137/234.5 |
| 3,967,639 | * | 7/1976 | Mottram | 137/234.5 |
| 3,990,467 | | 11/1976 | Sargent | 137/227 |
| 4,015,623 | | 4/1977 | Wanstreet | 137/224 |
| 4,015,624 | | 4/1977 | Wanstreet | 134/224 |
| 4,097,075 | * | 6/1978 | Clayton | 285/332.3 |
| 4,103,549 | | 8/1978 | Schmidt | 73/146.8 |
| 4,134,424 | | 1/1979 | Zeyra et al. | 137/493 |
| 4,384,543 | | 5/1983 | Wong | 116/34 |
| 4,520,664 | | 6/1985 | Kramer | 73/146.8 |
| 4,557,308 | | 12/1985 | Kuypers | 152/427 |
| 4,793,177 | | 12/1988 | Wu et al. | 73/146.8 |
| 4,869,306 | | 9/1989 | Keys | 152/427 |
| 4,883,107 | | 11/1989 | Keys | 152/431 |
| 4,901,747 | | 2/1990 | Yabor | 137/227 |
| 4,924,697 | | 5/1990 | Hunt | 73/146.8 |
| 4,991,618 | | 2/1991 | Gould | 137/227 |
| 5,014,643 | | 5/1991 | Huang | 116/34 |
| 5,054,511 | | 10/1991 | Tuan | 137/224 |
| 5,103,670 | | 4/1992 | Wu | 73/146.8 |
| 5,113,695 | | 5/1992 | Huang | 73/146.8 |
| 5,154,397 | | 10/1992 | Thomas | 251/328 |
| 5,257,642 | | 11/1993 | Worth | 137/230 |
| 5,289,161 | | 2/1994 | Huang | 340/447 |
| 5,307,846 | | 5/1994 | Heinemann | 141/1 |
| 5,325,886 | | 7/1994 | Klink | 137/227 |
| 5,365,967 | | 11/1994 | Moore | 137/226 |
| 5,553,647 | | 9/1996 | Jaksic | 152/415 |
| 5,569,849 | | 10/1996 | Cummings | 73/146.8 |
| 5,641,902 | | 6/1997 | Hong | 73/146.8 |
| 5,694,969 | | 12/1997 | DeVuyt | 137/226 |
| 5,713,390 | | 2/1998 | Huang | 137/539 |
| 5,778,923 | | 7/1998 | Marston | 137/226 |
| 5,819,779 | | 10/1998 | Takemura | 137/229 |
| 5,856,619 | | 1/1999 | Wang | 73/146.5 |
| 6,142,168 | * | 11/2000 | Sumrall | 137/226 |

FOREIGN PATENT DOCUMENTS 35501    1/1928  (FR) .

* cited by examiner

Primary Examiner—John Rivell
Assistant Examiner—Meredith H. Schoenfeld
(74) Attorney, Agent, or Firm—Fulbright & Jaworski L.L.P.

(57) ABSTRACT

The present invention is related to air pressure valve stems and gauges. More particularly, this invention relates particularly to tire stem valves possessing a built-in calibrated air pressure regulator and an optional integrated air pressure indicator.

61 Claims, 13 Drawing Sheets

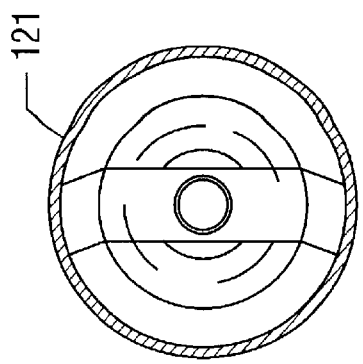
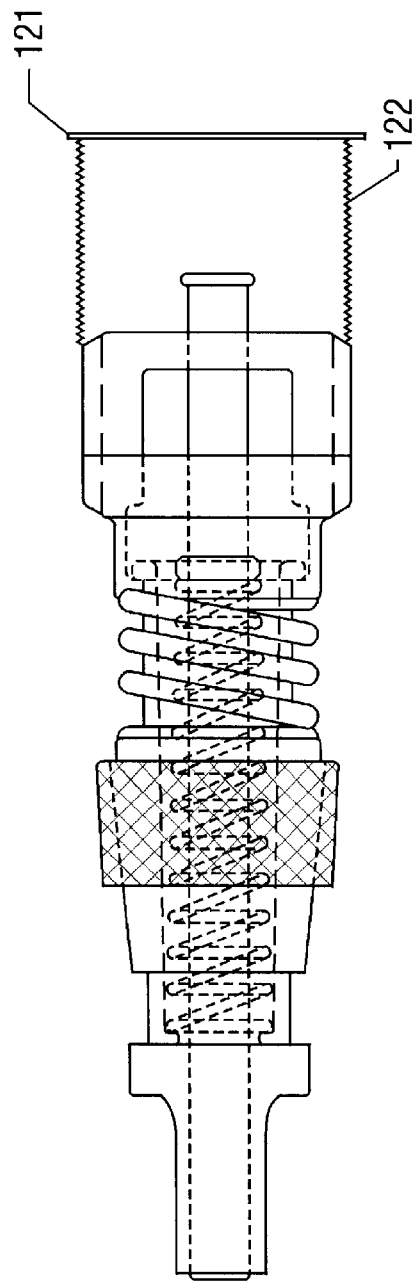
FIG. 14B
FIG. 14A

PRESSURE REGULATING TIRE VALVE AND CORE

The present application is a continuation-in-part of co-pending application 09/422,089 filed Oct. 21, 1999 which claims priority to U.S. patent application Ser. No. 60/105,471 filed Oct. 23, 1998, now abandoned. The entire text of each of the above-referenced disclosures is specifically incorporated by reference herein without disclaimer.

BACKGROUND OF THE INVENTION

A. Field of the Invention

The present invention is generally directed to air pressure valves and gauges, and more particularly to a tire valve and core possessing a built-in calibrated air pressure regulator and an optional integrated air pressure indicator.

B. Brief Description of Related Art

Maintaining proper tire pressure is important to achieving optimum vehicular performance and minimizing operating costs. Vehicles with over- or under-inflated tires generally suffer from impaired braking and handling (e.g. front-end shimmy, pulling to one side). This in turn poses a safety risk since the vehicle may not corner or decelerate effectively. Indeed, it is estimated that under-inflated tires contribute to approximately 260,000 accidents per year. Additionally, many motorists get stranded on busy highways and deserted rural roads due to blowouts partially caused by improperly inflated tires.

Improper inflation also results in accelerated tire tread wear and increased fuel consumption. Industry studies show that fuel savings of 5% or more are achievable when tires are run at their proper operating pressure. Furthermore, maintaining proper tire pressure can provide 20% more miles of tread life. Consequently, proper tire inflation saves the user money as well as being beneficial to the environment by reducing fossil fuel consumption, emissions, and the number of used tires that need to be disposed. Additionally, individuals often spend unnecessary time and money believing that they need car repairs, such as an alignment, when in actuality their tires are improperly inflated.

Standard tire valve stems simply house a valve that allows air to flow into and out of the tire. These existing valve stem mechanisms neither regulate nor measure and display the tire's air pressure to the user. Indeed, a separate tire pressure gauge must be employed to ascertain a tire's pressure, and this measurement must be compared with the manufacturer's recommendation. This requires extra effort on the part of motorists who are often unaware or unconcerned about the significance of proper tire inflation. Also, if the tire pressure gauge is not used or calibrated correctly, the user may inadvertently release air pressure from the tire or the pressure measurement may be incorrect, thereby exacerbating attempts to achieve the recommended pressure. Furthermore, many motorists do not check their tire pressure regularly and many may not even know how to locate the manufacturer's recommendation.

Wu, U.S. Pat. No. 5,103,670, teaches a pressure gauge incorporated into the tire stem and actuated by a mechanical bellows whose motion is then translated into a rotational displacement for the pressure indicator. The device fails to address the need for automatic air pressure regulation.

Van Heuval (U.S. Pat. No. 2,569,120), Hunt (U.S. Pat. No. 4,924,697), and Guy (U.S. Pat. No. 3,592,218) disclose tire air pressure gauges that are mounted onto a tire's existing valve stem. These devices do not directly integrate the pressure indicator into the valve stem mechanism nor do they address the need for automatic air pressure regulation.

Weaver, U.S. Pat. No. 1,590,141, teaches a pressure gauge integrated within the tire's valve stem. The device utilizes a glass U-tube filled with liquid glycerin to measure the pressure within the tire. This device does not address the need for automatic pressure regulation. Furthermore, the use of liquid-filled glass tubes makes for questionable durability in automotive use.

Many of these devices do not allow for the quick and facile release of tire pressure as is needed when changing tires; have very complicated designs; and would not be interchangeable with valve stems currently on the market, such as the Shrader valve stem.

The most common valve stem and incorporated into the majority of tires on the market today is known as the Shrader valve stem. The Shrader valve stem was patented in the late $19^{th}$ century. Currently known inflation and deflation devices tend to be rather complicated and are typically not interchangeable with the current Shrader valve core. Therefore, when their use is desired, the valve stem and core must replace an existing shrader valve stem and core. Furthermore, the valve stem and core must also be made inexpensively enough to be economically feasible for the buyer.

For example, DeVuyst, U.S. Pat. No. 5,694,969, discloses a tire valve with separate inflation and deflation devices incorporated in one stem. The deflation device uses a ball valve in conjunction with a hole cut into the side of the valve stem body. Unfortunately, the design of this valve stem is complicated and it would apparently not be interchangeable with the current Shrader valve core that is used on most tires.

Keys, U.S. Pat. No. 4,883,107, uses a central spring and pin design for tire inflation and a concentrically aligned outer spring for releasing excess tire pressure, both housed within the valve stem body. This design requires a significantly different valve stem body design that will not be interchangeable with the current Shrader valve core. Also, the user or installer must set the spring to a particular p.s.i. using a screw-in cap. This must be done each time this valve is replaced. Besides this, the screw-in cap is not locked down in any way. So, the cap may unscrew during use and defeat the whole purpose of the design.

Moore, U.S. Pat. No. 5,365,967, teaches a valve stem design that uses a ball valve design with a reeded air porting scheme. This design is complicated and would also not be interchangeable with the current Shrader valve core.

Klink, U.S. Pat. Nos. 5,325,886, and Wu, 5,103,670, disclose a valve stem that uses a built in valve gauge to tell the end user the pressure in the tire. This design does not automatically release excess tire pressure.

Tuan et al., U.S. Pat. No. 5,054,511, teaches a tire valve that uses one ball valve to allow air into the tire and another ball valve to release excess tire pressure through a hole drilled into the side of the valve stem body. This design is inconsistent with and would require a dramatic change in the Shrader valve stem.

Gould, U.S. Pat. No. 4,991,618, teaches a tire valve that uses four different spring structures working in conjunction to shut off the tire valve once the tire reaches the desired pressure. This large, complicated design does not release excess tire pressure and therefore does not address the need for releasing air from an over-inflated tire.

Keys, U.S. Pat. No. 4,869,306, discloses a tire valve that uses a central pin design in order to allow air into the tire and an offset spring design attached to the side of the valve stem body that releases excess air pressure through a hole in the side of the valve stem body. This design would require a dramatic change in the Shrader valve stem design and would not be interchangeable with the current Shrader valve core.

Zeyra, U.S. Pat. No. 4,134,424, discloses a tire valve that uses a Shrader valve core to allow air into the tire and an elastic membrane to allow excess air pressure to escape through a long tube running parallel to the longitudinal axis of the valve stem body. This design would require a dramatic change in the Shrader valve stem design and would not be interchangeable with the current Shrader valve core.

Wanstreet, U.S. Pat. No. 4,015,623, discloses a tire valve having two separated devices set up in a smoke stack type design. One device is used to inflate the tire. The other is used to release excess tire pressure. This design would require a dramatic change in the Shrader valve stem design and would not be interchangeable with the current Shrader valve core.

Thus, there is an identifiable need for providing a simple mechanism that would be interchangeable with currently-marketed valve stem cores and housings to assist individuals in measuring and maintaining proper tire pressure in order to ensure prolonged tire life, optimal energy efficiency, safe handling, lowered emissions, and decreased automobile maintenance. However, such a simple and easy mechanism or device to aid motorists in achieving proper tire inflation is currently unavailable, particularly a device that would allow for the quick and facile release of tire pressure, e.g. to assist tire retailers in rapidly changing tires.

SUMMARY OF THE INVENTION

It is an object of the present invention to provide a valve stem mechanism that automatically prevents inadvertent over-inflation by automatically releasing any excess tire pressure until the recommended pressure is achieved. This is accomplished by means of a pressure-sensitive mechanism, such as a calibrated spring, rubber, foam, polymer, or other elastic or pressure-sensitive material, within the valve stem mechanism. The pressure-sensitive mechanism is compressed by excessive pressure within the tire so as to release excess air pressure, for example, by revealing at least one bleed aperture (such as an opening, a hole, or a gap) through which the tire's air may escape. When enough air has escaped and the pressure has sufficiently decreased, the pressure-sensitive mechanism may extend enough to halt the release of any more air by, for example, sealing the bleed aperture(s).

Thus, an aspect of the present invention encompasses a tire stem valve and core for automatically controlling the internal pressure of a tire. This tire stem valve typically contains a hollow valve core housing, a one-way valve, a seal-and-release mechanism, a pressure-sensitive mechanism, and one or more structures which allow for the release of air in response to the pressure-sensitive mechanism.

Typically, the hollow valve core housing will be cylindrical having a longitudinal axis and two ends, a tire-side end and an inflation-side end. Although such cylindrical stems are preferable to allow for compatibility with current commercially-available tire stems, other housings having a different shape or additional protrusions from the housing may also be employed with the present invention.

A further aspect of the present invention is to integrate a one-way inflation valve together with a pressure release valve in the same tire valve mechanism. This integrated single unit avoids having to have two separate tire valves, a first valve to allow for inflation, and a second pop-off or other overpressure valve to vent excess pressure. Having such a single integrated valve unit reduces complexity and helps minimize costs.

The one-way inflation valve serves to open when the pressure outside of the tire is greater than the pressure inside of the tire. Thus, this valve may be any valve, of which many are known in the art, that allows for the inflation of the tire when exposed to air pressure, for example, from a standard air pressure hose. Such valves may include, but are not limited to: flap valves, needle valves, and ball valves.

The tire stem valves of the present invention may contain a seal-and-release mechanism. This mechanism may be any structure or device that is responsive to the pressure-sensitive mechanism so as to discharge excess air when the tire is over-inflated and halt the release of such air when proper tire pressure is reached. This mechanism may or may not allow for the release of air during operation of the automobile and tire, depending on the needs or desires of the consumer.

One example of a seal-and-release mechanism is a movable disk contained within the valve stem core housing which is capable of moving along the valve stem core housing preferably parallel to the longitudinal axis. For example, the movable disk may comprise an O-ring or O-ring assembly that moves longitudinally along the stem core housing in response to an increase or decrease in the internal air pressure of the tire or the extension or contraction of the pressure sensitive mechanism or both. This embodiment may employ a plunger with the O-ring as part of a core for use with an existing valve stem. The existing taper in a conventional valve stem body, or a shoulder cut into an existing valve stem body, may be used to create an air tight seal with the O-ring. The longitudinal displacement of the O-ring from this seal in response to the internal air pressure of the tire and the pressure-sensitive mechanism or material then creates a bleed aperture, in this case a gap, to allow for the release of air from the tire. As the proper pressure is reached, the longitudinal displacement of the O-ring decreases until a positive, air tight, seal is again formed.

Typically, the movable disk, such as an O-ring, may effectuate an air-tight seal when the tire pressure is at or below the desired value and move to release air in response to the pressure-sensitive mechanism when the tire is over inflated. For embodiments employing such a disk for the seal-and-release mechanism, it may be preferable, in some embodiments, to employ a one-way valve at or near the center of the disk for tire inflation.

When the movable disk is not an O-ring, the valve stem will typically include a centrally-mounted tube running parallel to the longitudinal axis of the valve stem core housing from the inflation-side end of the valve stem core housing to a plenum chamber affixed to the movable disk.

In another embodiment, a moveable chamber which moves parallel to the longitudinal axis in response to the pressure-sensitive mechanism or material is employed.

The tire stem mechanisms of the present invention may contain a pressure-sensitive structure or mechanism. This structure is typically an elastic or pressure-sensitive structure or material which is located within the valve stem core housing, and connected to the core, and positioned so as to cause the seal-and-release mechanism to release air when the tire is over-inflated, preferably by contracting or expanding in response to the pressure inside the tire. Exemplary pressure-sensitive mechanisms include elastic or pressure-sensitive materials, such as springs, rubbers, foams, and polymers. The phrase "elastic materials" refers to material that is capable of contracting in response to an increase in pressure inside the tire and then of extending back to its original shape or structure when the excess air is released and the pressure returns to a desired value.

For example, if the seal-and-release mechanism is a movable disk, such as an O-ring, the pressure-sensitive mechanism may be positioned between the disk and a connected solid support structure. In these embodiments, the connected solid structure is typically connected to the valve stem core housing, and the pressure-sensitive mechanism extends and contracts in response to the air pressure forces acting upon the movable disk. For embodiments employing an O-ring/plunger combination, the internal tire air pressure actually exerts a force on one end of said combination. When the air pressure forces acting upon the disk or O-ring/plunger combination exceed the pre-selected pressure, the pressure-sensitive structure extends or contracts to expose at least one bleed aperture. As air is released and the air pressure within the tire reaches the pre-selected value, the pressure-sensitive structure responds to close the aperture(s).

As used herein, the term "connected" means attached by mechanical or chemical means (i.e. physically screwed in through threads, attached by a glue, weld, rivet or other means, or held in close proximity such that parts of two or more structures or materials remain in physical contact, such as the opposing ends of a spring that is compressed between two solid materials) or integrally connected or part of the object to which it is connected (i.e. the solid support may be an integral part of the valve stem core housing).

The tire stems of this invention may also include one or more structures which allow for the release of air in response to the pressure-sensitive mechanism. These structures may be part of or external to the seal-and-release mechanism, described above. If the seal-and-release mechanism is the moveable disk, such as the O-ring described above, exemplary release structures may be bleed apertures located such that they provide a route for air to exit the tire when they are exposed by the movement of the moveable disk or O-ring. Thus these bleed apertures may be in the disk, in a solid support in contact with the disk, or a gap caused by the movable disk being forced away from a solid support.

In a first embodiment of the invention, a one-way flap valve may be used to allow air to enter the tire but prevent it from escaping. Alternatively, other one-way valve designs may be used. The valve may be located on a disk that is able to move longitudinally along the length of the valve stem. The disk may be biased by a spring or other elastic or pressure-sensitive material so that when the tire pressure is higher than desired, the spring or material is compressed by back pressure on the disk such that the disk exposes one or more apertures that allow air to bleed out of the tire. As mentioned above these bleed apertures may be located on the disk, on a structure in contact with the disk, or may simply comprise a gap created by the movement of the disk. As the tire pressure drops, the spring extends, pushing the disk against a solid support within the valve stem core housing and closing off the bleed apertures just as the recommended pressure is reached.

Thus, this first embodiment encompasses a tire stem valve for automatically controlling the internal pressure of a tire containing at least a hollow cylindrical valve stem housing having a longitudinal axis, a tire-side end and an inflation-side end; a one-way valve for inflating the tire which may or may not be located at or near the center of a movable disk; a movable disk contained within the valve stem core housing and capable of moving along its longitudinal axis, the disk effectuating a substantially air-tight seal when the tire pressure is at or below the desired value; a pressure-sensitive structure, such as a spring, polymer, or foam, located within the valve stem housing and positioned between the movable disk and a solid support structure connected to the valve stem core housing; and one or more bleed apertures. In this embodiment, the pressure-sensitive structure extends and contracts in response to the air pressure forces inside the tire acting upon the movable disk.

Preferably, for embodiments employing a spring, the spring is calibrated or otherwise selected such that it will push the movable disk against the solid support to form an air-tight seal when the tire pressure reaches a pre-selected value. The pressure release threshold is determined by selecting a spring with the appropriate spring constant and adjusting the pre-compression or pre-tension of the spring.

This tire stem valve may further include a second solid support connected to the valve stem core housing which creates an air-tight seal with the movable disk when said disk is pushed against said second solid support by the pressure-sensitive structure. Preferably, the movable disk and the second solid support have a rubbery coating or other sealing material to improve the performance of the air-tight seal. The second solid support in some embodiments is an integral part of or built into the valve stem core housing. This solid support may merely comprise a taper, shoulder or ridge in the housing. The second solid support may also be connected to the housing by chemical or mechanical means.

Tire stem valves may also include a centrally-mounted tube running parallel to the longitudinal axis of the valve stem housing from the inflation-side end of the valve stem housing to a plenum chamber affixed to the movable disk. Tire stem valves may further have an additional or third solid support attached to the stem housing and positioned so as to limit the linear travel of the movable disk along the longitudinal axis of the stem housing. The purpose of this third solid support is to limit the amount of air released during normal operation of the vehicle in response to physically-caused changes in pressure, such as when the tire hits a curb or large pothole.

An aspect of this embodiment also encompasses a tire stem valve for automatically controlling the internal pressure of a tire including:
  a hollow cylindrical valve stem housing having a longitudinal axis, a tire-side end and an inflation-side end;
  a movable disk with a one-way flap valve at or near its center and bleed apertures on its surface located within the valve stem housing and capable of moving along the longitudinal axis;
  a spring located within the valve stem housing and positioned between the movable disk and a first solid support connected to the valve stem core housing, the spring extending and contracting in response to air pressure forces acting upon the movable disk;
  a second solid support attached to the valve stem housing, the support forming an air-tight seal with the movable disk by closing off the disk's bleed aperture(s) when the movable disk is pushed against the second solid support by the spring;
  a centrally-mounted tube running parallel to the longitudinal axis of the stem housing from the inflation-side end of the stem to a plenum attached to the surface of the movable disk; and one or more solid supports for supporting the centrally-mounted tube within the stem housing.

The purpose of the centrally-mounted tube is to allow for the insertion of a thin needle to push open the flap valve in order to deflate the tire. The tire stem valve may further contain an additional solid support attached to the stem housing and positioned to limit the linear travel of the movable valve along the longitudinal axis of the stem housing.

In a second embodiment of the invention, a ball valve is used to regulate the tire pressure. The ball is contained within a chamber in the valve stem's housing that is biased by a spring or other elastic material. The chamber possesses at least one bleed aperture that allows excess air to leak out of the tire until the pressure decreases enough to allow the spring or elastic material to push the chamber away from a thin tube that protrudes into the chamber through the aperture. The spring or elastic material is selected so that the tube just clears the bleed aperture and allows the ball to form a seal as the tire pressure reaches its recommended value.

This second embodiment encompasses a tire stem valve for automatically controlling the internal pressure of a tire including at least:

a hollow cylindrical stem housing having a longitudinal axis, an inflation-side end, and a tire-side end;

a movable valve assembly located within the stem housing;

a spring located between the movable valve assembly and a solid support affixed to the stem housing;

a second spring located between the movable valve assembly and a second solid support connected to the stem housing, where the second spring and second solid support are located on the tire-side end of the movable valve assembly;

a centrally-mounted tube running parallel to the longitudinal axis of the stem housing from the inflation-side end of the stem housing to the substantial center of the movable valve assembly and positioned such that the tire-side end of the tube can enter and exit the chamber through the bleed aperture(s) as the movable valve assembly moves along the longitudinal axis of the stem housing; and one or more solid supports for supporting the centrally-mounted tube within the stem housing.

Typically the movable valve assembly in this embodiment will be formed by a chamber having a longitudinal axis, containing a ball, and possessing one or more bleed apertures at the inflation side end, one or more bleed apertures at the tire side end, and one or more apertures on its longitudinal surface. This chamber may also have a rigid disk on the inflation side end that has a centrally located aperture to create an air tight seal with the ball when the tire is properly inflated.

The tire stem valve may also have a transparent window in the stem housing. The window may have reference marks that together with an appropriate indicator mark show the pressure inside the tire or whether the tire is over or under inflated. The indicator mark itself may be affixed to a portion of the movable valve assembly.

In a third embodiment of the invention a hole valve is used in conjunction with a flap valve to control and regulate the tire's pressure. The flap valve allows air to enter the tire during inflation. A movable disk is biased by a spring or other pressure-sensitive means such that when the tire pressure is above the desired value air bleeds from a hole bored into the side of the valve stem. As the tire pressure decreases, the spring or pressure-sensitive material pushes the disk towards the tire such that the bleed hole or aperture becomes sealed just as the desired pressure is reached.

Thus, this third embodiment encompasses a tire stem valve including: a hollow cylindrical valve stem housing having a longitudinal axis, an inflation-side end, and a tire-side end; a one-way flap valve located at or near the center of a movable disk; the movable disk contained within the valve stem housing and capable of moving along its longitudinal axis, the disk effectuating a substantially air-tight seal when the tire pressure is at or below the desired value; a pressure-sensitive structure located within the valve stem core housing and positioned between the movable disk and a solid support structure connected to the valve stem housing, the pressure-sensitive structure extending and contracting in response to the air pressure forces acting upon the movable disk; and one or more bleed apertures in the wall of the valve stem housing.

The tire stem valve of this third embodiment may optionally include a second pressure-sensitive or elastic structure, preferably a spring, mounted between the movable disk and a second solid support structure affixed to the inner surface of the valve stem housing. Another optional feature is a centrally-mounted tube running parallel to the longitudinal axis of the valve stem housing from the inflation-side end of the valve stem housing to a plenum chamber affixed to the movable disk. This embodiment may further encompass a tire stem valve having a transparent window in the valve stem housing, and preferably having a calibrated reference mark or marks which indicate over or under inflation of the tire. The indicator mark itself may be located on the movable disk.

In a fourth embodiment of the present invention a one-way ball valve is used to allow the one-way flow of air into the tire during inflation. The ball valve assembly is mounted on a disk that is movable along the valve stem housing's longitudinal axis. As in the first embodiment, the movable disk is biased by a spring or other means such that one or more bleed apertures in the disk are exposed if the tire is over-inflated in order to allow for the release of the excess tire pressure. When the tire pressure reaches its recommended value, the movable disk is pushed by the spring against a connected solid support, thus sealing off its bleed apertures and preventing the release of any more pressure.

Thus, this fourth embodiment encompasses a tire stem valve including: a hollow cylindrical valve stem housing having a longitudinal axis, an inflation-side end, and a tire-side end; a one-way ball valve; a movable disk contained within the valve stem housing and capable of moving along its longitudinal axis, the disk effectuating a substantially air-tight seal when the tire pressure is at or below the desired value; a pressure-sensitive structure located within the valve stem housing and positioned between the movable disk and a first solid support structure connected to the valve stem housing, the pressure-sensitive structure extending and contracting in response to the air pressure forces acting upon the movable disk; and one or more bleed apertures.

Ball valves for use with this embodiment typically contain a ball, a cylindrical housing having apertures, and a spring. The tire stem valves of this embodiment may have at least one bleed aperture through the surface of the movable disk or a second connected solid support attached to the valve stem housing and creating an air-tight seal with the movable disk when the disk is pushed against said solid support by the pressure-sensitive structure. This embodiment also encompasses a tire stem valve having a centrally-mounted tube running parallel to the longitudinal axis of the valve stem housing from the inflation-side end of the valve stem housing to a plenum chamber affixed to the movable disk.

This fourth embodiment also encompasses a tire stem valve including: a) a hollow cylindrical valve stem housing having a longitudinal axis, an inflation-side end and a tire-side end; b) a movable disk having a hole at or near its center and bleed apertures on its surface located within the valve stem housing and capable of moving along its longitudinal axis; c) a spring located within the stem housing and positioned between the movable disk and a first support structure connected to the valve stem housing, the spring extending and contracting in response to air pressure forces acting upon the movable valve; d) a second solid support connected to the valve stem housing, the support forming an air-tight seal with the movable disk by closing off the bleed apertures when the movable disk is pushed against the solid support by the spring; and e) a hollow cylindrical housing affixed to the movable disk, the cylindrical housing possessing one or more apertures and containing both a second spring and a ball.

Such tire stem valves may further including: (i) a plenum chamber with one or more apertures that allow air to pass into the plenum chamber and on into the hole at or near the center of the movable disk as well as (ii) a centrally-mounted tube running parallel to the longitudinal axis of the valve stem housing from the inflation-side end of the valve stem housing to the plenum chamber. Another optional feature is an additional solid support connected to the valve stem housing, such as a ridge in the inner wall of the valve stem housing, that limits the longitudinal travel of the movable disk.

The hollow cylindrical housing may contain a second spring and the ball may be affixed to the tire-side of the movable valve such that the ball is pushed by the spring against the movable disk's hole to form an air tight seal. The apertures in the cylindrical housing may also be located such that they are exposed during tire inflation allowing air to flow through the movable disk's hole and into the tire.

The tire stem valves disclosed herein may also have an audible whistle. The whistle operates when air exits the tire stem valve. This audible whistle may be composed of a rigid disk located within the valve stem housing having aerodynamic features which create a whistling sound when air passes through the disk. Suitable aerodynamic features may include but are not limited to spokes, vanes, or balls.

In a fifth embodiment of the present invention, the valve includes a mechanism that is designed to screw into existing valve stem core housings. A needle valve biased by a spring or an elastic material is used to allow for the one-way flow of air into the tire. The mechanism uses a plunger with an O-ring (preferably positioned around the plunger) biased by a second spring or elastic material to create an air tight seal between the mechanism and the inner wall, or a shoulder or ridge cut into the inner wall, of the valve stem core housing. If the tire pressure is above the desired value, the air pressure forces acting on the plunger compress the spring and allow the plunger to move away from the inner wall, or a shoulder or ridge cut into the inner wall, of the valve stem core housing thus breaking the O-ring's seal and allowing air to escape. The second spring is selected or calibrated such that the plunger and O-ring reforms its seal with the valve stem core housing, or a shoulder or ridge cut into the inner wall, just as the recommended pressure is reached. It will be obvious to one skilled in the art that the pressure release threshold can be adjusted by selecting, or manufacturing, a second spring with the appropriate spring tension and load that is preset for a specific pre-compression or pre-tension.

The second spring is then mounted in the valve mechanism or the valve stem core. Then the valve stem and core mechanism is set for a specific, non-adjustable p.s.i. It will simply be screwed into the tire valve stem core housing until it stops.

This fifth embodiment encompasses a tire stem valve core mechanism including:

a) a pin with an affixed end-cap at a first, tire-side end, a first raised outer flange at the opposite end (a second, inflation-side end), and a second raised outer flange positioned between the two ends. Typically, this pin is centrally located along the valve mechanism's longitudinal axis.

b) a first spring, having a first and second end, proximal to the pin. The second, inflation-side end of the first spring is braced by the second raised outer flange of the pin. The first spring may be proximal to said pin such that it is either adjacent to or concentric with the pin.

c) a plunger assembly proximal to said first spring and able to move along a longitudinal axis of said pin. The plunger assembly may be proximal to the first spring such that it is adjacent to or concentric with the first spring.

d) a base proximal to the end of the pin opposite said end-cap. The base may be proximal to the end of the pin such that it is adjacent to or concentric with the end of the pin. And, e) a second spring proximal to the base and the plunger assembly.

The plunger assembly may brace one end of the first spring and further comprises a plunger body and one or more end-shafts. The plunger may also have a rubber or plastic ring positioned around the plunger body. The second spring may be proximal to the base and plunger assembly such that it is concentric with an end-shaft at the inflation-side end of the plunger assembly. The tire-side end of the second spring is braced by the plunger and the opposite, inflation-side, end of the second spring is braced by the base.

The base may also be threaded to allow it to screw into existing or commonly used tire stems. The base may also have a member at the tire-side end defining a hollow cylindrical portion and a U-shaped cross-member affixed to or integral with the member. A ridge is formed at the junction of the member defining the hollow cylindrical portion of the base with the U-shaped cross-member. In this embodiment, the hollow cylindrical portion of the base may also comprise an inner flange at its end and a recessed valley between said inner flange and the ridge formed by the junction with the cross-member.

In this embodiment, the plunger end-shaft may also have an outer flange at its end that is only able to move longitudinally within the base's valley so as to limit the movement of the plunger assembly as a whole. The U-shaped cross-member may also have a central hole. Typically, this hole is large enough for the pin's body to slide through but small enough such that the first raised outer flange at the end of the pin prevents the inflation-side end of the pin from sliding into said hole.

A transparent wall in the valve stem housing allows the user the option of monitoring the tire's inflation. This option can be utilized in the second and third embodiments of the present invention. The transparent wall allows for the viewing of indicator marks made on moving parts of the internal mechanisms. The user can thus determine if the tire pressure is too low or when they have inflated the tire with sufficient air by viewing the indicator marks within the transparent window. In some variations of the invention, the indicator shows the exact tire pressure by its position relative to calibrated marks on the transparent window. In these variations, the pressure release thresholds are set higher than the manufacturers ratings but below any dangerous levels in order to allow users more control over the tire's pressure. This is useful for situations in which it may be desirable to temporarily over-inflate the tire.

It is an object of the first through fourth embodiments of the invention to provide an integrated valve stem housing and valve stem mechanism that is interchangeable with current industry standard valve stem designs. This helps facilitate easy replacement of existing valve stems with the present invention. The fifth embodiment of the present invention is a valve mechanism without an integrated valve stem housing. The housing is not needed because the fifth embodiment of the present invention can be screwed into current industry standard valve stems. This makes replacement of existing valve stem mechanisms even easier because the valve stem itself does not have to be removed from the tire's rim. The user merely has to unscrew the existing mechanism from a tire's valve stem and screw in the fifth embodiment of the invention. Additionally, a shoulder cut into the inner wall of an existing valve stem core housing will facilitate a positive air tight seal. The fifth embodiment is interchangeable with existing valve stem cores regardless of modifications made to existing valve stem housings.

In one embodiment, the invention provides an improvement to the existing Shrader valve stem. The Shrader valve stem includes a longitudinal axis, a tire-side end and an inflation-side end. The invention provides a modified valve stem core. The modifications to the core include a calibrated pressure-sensitive structure, an O-ring and a shoulder cut into the inner wall of the valve stem. When the pressure inside the tire is the desired pressure, the O-ring is seated against the shoulder and forms an air-tight seal with the inner wall of the valve stem. The O-ring is movable along the longitudinal axis of the valve stem in response to an increase or decrease in the internal pressure of the tire. The pressure sensitive structure is in contact with the O-ring such that the O-ring moves along the longitudinal axis toward the inflation-side end of the valve stem when the internal pressure of the tire exceeds a desired value creating an aperture through which excess air escapes thereby returning the internal pressure to the desired value and causing the O-ring to move along the longitudinal axis toward the tire-side end of the valve recreating the air-tight seal.

Another aspect of the invention encompasses the incorporation of the tire valve mechanism of the fifth embodiment into a cap which may be attached to a tire stem valve core and housing.

All embodiments of the present invention may also employ a sound generating mechanism that creates an audible whistle when air is release from the tire. The whistle typically has aerodynamic features, such as reeds, spokes, vanes, or balls, which create a whistling sound when air passes through the disk.

BRIEF DESCRIPTION OF THE DRAWINGS

FIG. 14 illustrates a top and cut away view of an elongated and flared base and its use with the fifth embodiment, respectively.

FIG. 17 shows the modified fifth embodiment in a slightly unscrewed position.

DESCRIPTION OF THE PREFERRED EMBODIMENTS

The present invention consists of a series of embodiments for a valve stem with an internal mechanism that prevents tire over-inflation by releasing excess pressure until an equilibrium is established. The valve stem and core is designed to be a form fit replacement for existing commercially available stems so that no special tires or rims are necessary. Alternatively, the valve stem mechanism may be screwed into commercially available tire stem core housings. This enables car manufacturers to easily, and inexpensively incorporate the invention into their production lines, and allows consumers to switch over to the new valve at their next tire change.

Figure 1:
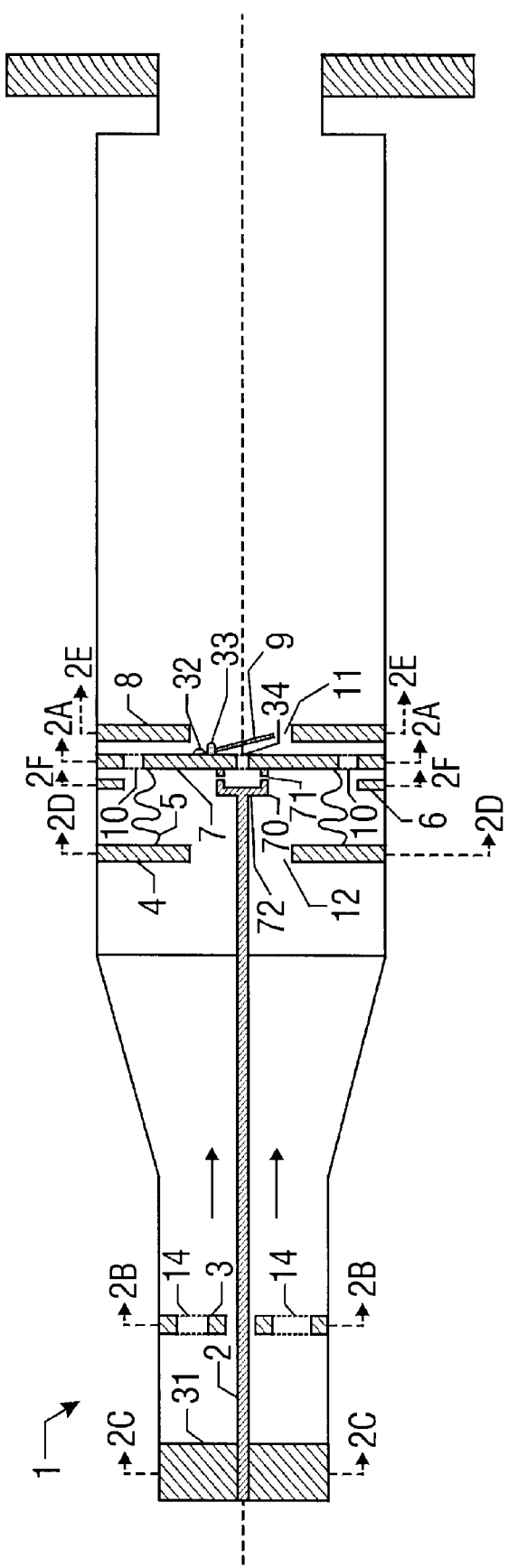
FIG. 1 illustrates a cross-sectional view of the first embodiment of the present invention. This embodiment utilizes a flap valve and biasing spring to prevent the tire from being over-inflated.

FIGS. 1 and 2 illustrate an example of the first embodiment of the invention. A tapered cylindrical stem 1 houses the pressure regulating mechanism. A flap valve 9 is typically located substantially at the center of a movable disk 7, within the stem housing. Alternatively, other one-way valve designs may be used. The disk 7 is able to move along the longitudinal axis of the stem 1, and it is of sufficient thickness so as to prevent itself from jamming against the inner wall of the stem housing.

Figure 2A:
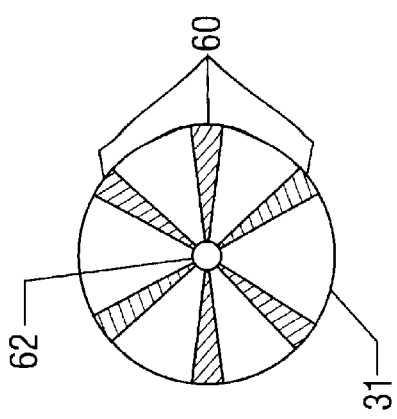
FIG. 2 illustrates front views of the various disk structures that comprise the pressure regulation and indication mechanism within the stem valve.
Figure 2B:
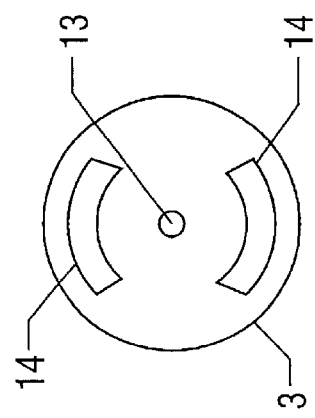
Figure 2C:
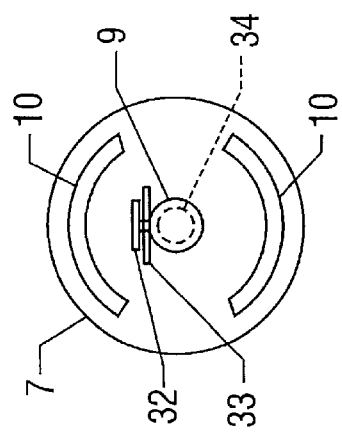
Figure 2D:
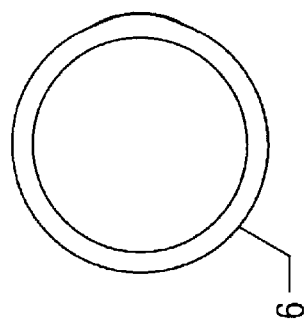
Figure 2E:
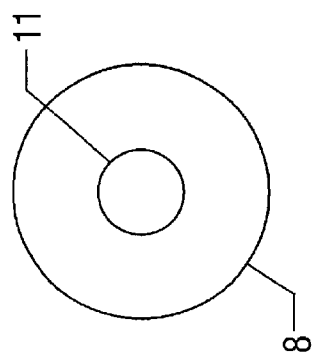
Figure 2F:
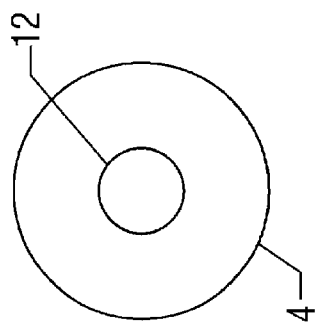
Figure 3:
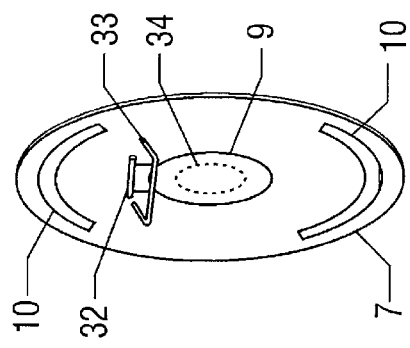
FIG. 3 shows a three-quarter perspective view of the flap valve design used by the first embodiment.
Figure 8:
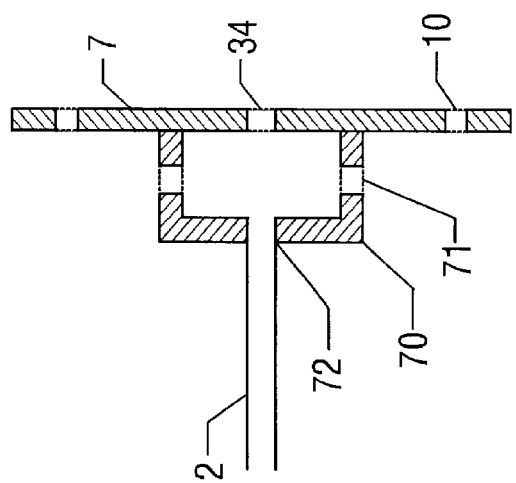
FIG. 8 illustrates a cross-sectional view of the plenum chamber that connects to both the thin tube and the movable disk. The plenum chamber possesses a central aperture to which the tube's opening is attached and apertures along its side to allow air to reach the central hole of the movable disk.

The flap valve 9 is unidirectional and allows air to enter the tire but does not allow air to escape. FIG. 3 illustrates a three-quarter view of the movable valve structure/disk assembly. The flap itself 9 covers a hole 34 at or near the center of the disk 7 and is able to rotate about a hinge 32 in order to cover or expose said hole 34. The movement of the flap is typically limited by a bracket 33 or other stopping structure so that the flap cannot be inadvertently stuck in the open position. The disk 7 itself is rigidly connected to a hollow cylindrical plenum chamber 70 that possesses a central opening 72 on its face, to which a long, narrow, centrally-located tube 2 is connected. The sides of the cylindrical plenum chamber 70 also possesses additional apertures 71. This tube-cylinder-disk assembly is illustrated in FIG. 8. The tube 2 passes through the hole 13 of a connected solid support structure, disk 3, that is rigidly coupled to the interior wall of the valve stem housing 1. The thin tube 2 extends to the end of the valve stem and is supported at the end of the stem by another solid support structure, disk 31. Disk 31 consists of radially oriented spokes or vanes 60 as shown in FIG. 2. The purpose of these vanes is to generate an audible whistling sound when air is released from the tire so that the operator knows that the valve is operating correctly. The tube 2 opens the valve of an air compressor's hose attachment (not shown) when the attachment is pressed against the tire valve during inflation.

A spring is located between the movable disk 7 and a solid support 4, generally in the form of a disk, affixed to the valve stem housing 1. The spring 5 is selected and calibrated such that disk 7 is flush with another solid support structure, disk 8, when the pressure in the tire is at its recommended value. Disk 8 is rigidly attached or connected to the interior surface of the valve stem housing 1. Instead of a spring 5, any other suitable elastic material may be utilized (e.g. polymers, foam, rubber, etc.).

When the tire is being inflated, incoming air first passes through the spokes or vanes 60 of disk 31. The air then passes through the apertures 14 of disk 3, through the center hole 12 of disk 4, then through the apertures 71 of the cylindrical plenum chamber 70, through the flap valve 9, and finally through hole 11 of disk 8 and on into the tire. If the tire is over-inflated the tire-side pressure will exert a force countering that of spring 5 and cause disk 7 to move towards disk 4. This allows air from the tire to move through hole 11 of interior wall 8 and then through exposed bleed apertures 10 of disk 7 and on out of the valve stem. As the air is released and the tire pressure decreases, the force on the spring 5 decreases in turn so that it will continue to extend away from disk 4 and towards disk 8 as the pressure drops. Just as the tire pressure reaches its recommended value, the spring will have extended enough to push disk 7 flush with disk 8 thereby closing off its bleed apertures 10, forming an air-tight compressive seal against disk 8, and preventing the release of any more air pressure. Disks 7 and 8 may be coated with a rubbery coating or other sealing material so as to help form an effective seal when they are in contact with each other.

Disk 6 is an optional interior wall or other solid support that is rigidly attached or connected to or integrally formed as part of the inner surface of the valve stem. The function of disk 6 is to limit disk 7's longitudinal travel within the valve stem. This is intended to minimize inadvertent releases of air from the tire due to instantaneous pressure rises caused by rolling over objects such as curbs and rocks. The diameter of the spring 5 and the inner diameter of disk 6 are selected so that disk 6 does not interfere with the motion or function of the spring 5. To deflate the tire, a thin pin (not shown) is manually inserted into the tube 2 far enough back so as to push open the flap valve 9 and release air.

Figure 4:
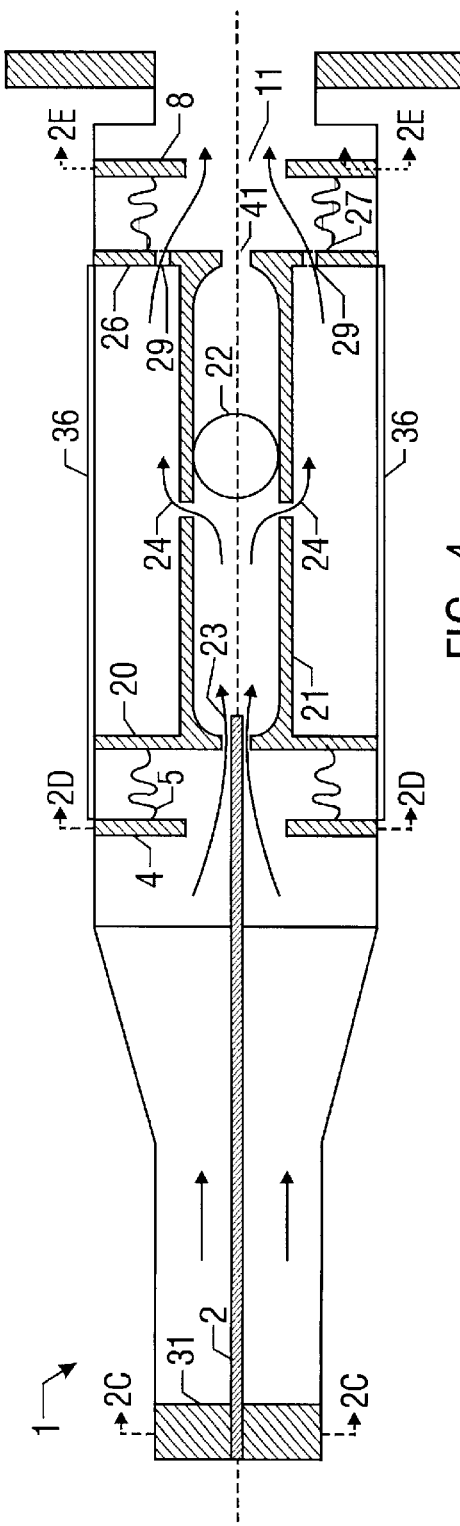
FIG. 4 illustrates a cross-sectional view of the second embodiment of the present invention. This embodiment utilizes a ball valve within an inner chamber to regulate the flow of air into and out of the tire and thus control the tire's pressure.
Figure 5:
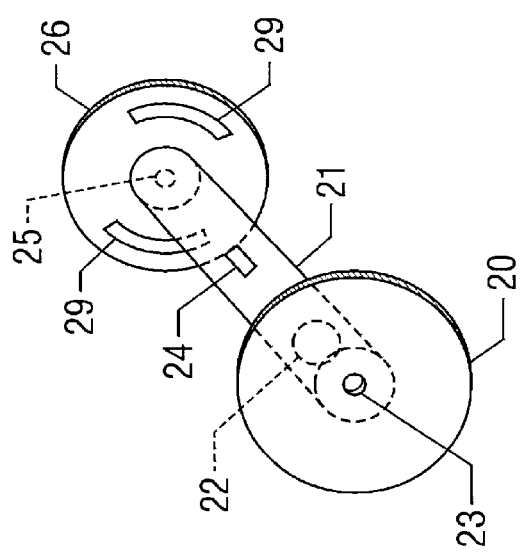
FIG. 5 illustrates a perspective three-quarter view of the inner chamber assembly of the second embodiment comprising a ball valve, inner chamber, and end disks.

As illustrated in FIG. 4, the second embodiment of the invention utilizes a ball valve in conjunction with an interior chamber 21 to control the tire pressure. In this embodiment, there is an inner chamber 21 concentric with and having a longitudinal axis parallel to the valve stem housing 1. This inner chamber contains a ball 22 and possesses one or more apertures along its longitudinal surface 24. The inner chamber 21 also has an aperture at its end closest to the tire 41 and a bleed aperture 23 at the other end. Both ends of the inner chamber 21 are also rigidly attached or connected to two disks 20 and 26 with central apertures 23 and 41. Disk 26 also possesses apertures 29 through its surface. The assembly formed by disks 20 and 26 and interior chamber 21 is shown in FIG. 5. This assembly is free to move along the longitudinal axis of the tire stem in response to the spring and air pressure forces acting upon it. The inner diameter of the valve stem and the diameters of the disks 20 and 26 are manufactured to a precision sufficient to create an effective pressure seal between the disk's edges and the valve stem's inner surface. A grease or lubricant may also be used to help effectuate such a seal.

A spring 5 is positioned between disk 20 and a solid support structure, disk 4, attached or connected to the inner surface of the valve stem housing 1. A thin centrally-mounted tube 2 runs from the end of the stem, where it is supported by disk 31, to the bleed aperture 23 of disk 20 and inner chamber 21. The tube 2 is positioned such that it may enter and exit the chamber 21 through the aperture 23 as said chamber moves along the valve stem housing's 1 longitudinal axis.

A solid support structure, disk 8, is rigidly attached or connected to the interior wall of the valve stem housing 1 and has a central opening 11. Between disk 26 and disk 8 is a spring 27. The purpose of disk 8 and spring 27 is to limit and dampen the motion of the inner chamber assembly when compressed air is first applied to the valve to inflate the tire.

During tire inflation incoming air passes through hole 23 of disk 20 and pushes ball 22 to the back of the inner chamber 21. The air then passes through the apertures 24 of the interior chamber 21, the apertures 29 of disk 26, the center hole 11 of disk 8, and then on into the tire. If the tire has been over-inflated, its back-pressure will act upon disk 20 and compress the spring 5. This in turn causes the thin tube 2 to protrude into the chamber 21 through the bleed aperture 23. The tire-side pressure also acts upon the ball 22 via aperture 41 and pushes it down the chamber 21 and against the tube 2. The ball itself is of smaller diameter than the chamber 21 so that it can both move freely within said chamber and allow for the flow of air between the ball's surface and the inner surface of the chamber.

If the tire is over-inflated, the thin tube 2 will protrude through the bleed aperture 23 and prevent the ball 22 from sealing said aperture thus allowing air to bleed out. As air leaks from the aperture, the tire-side pressure drops, causing less force to be exerted by the wall 20 against the spring 5. As the spring 5 extends in response to the falling tire pressure, it pushes the interior chamber assembly (disks 20 and 26, chamber 21) towards the tire and away from the central tube 2. The length of the tube 2 and the properties of spring 5 are selected such that the tube 2 just clears the bleed aperture 23 and allows the ball 22 to create a seal as the tire pressure reaches its recommended value. The ball 22 and the inside surface of the chamber 21 are coated with a rubbery coating or other sealing material so as to improve the seal between the ball 22 and the edge of the bleed aperture 23. To deflate the tire a thin pin (not shown) is inserted into the tube 2 so as to push back the ball 22 and allow air to release through the aperture 23.

Figure 6:
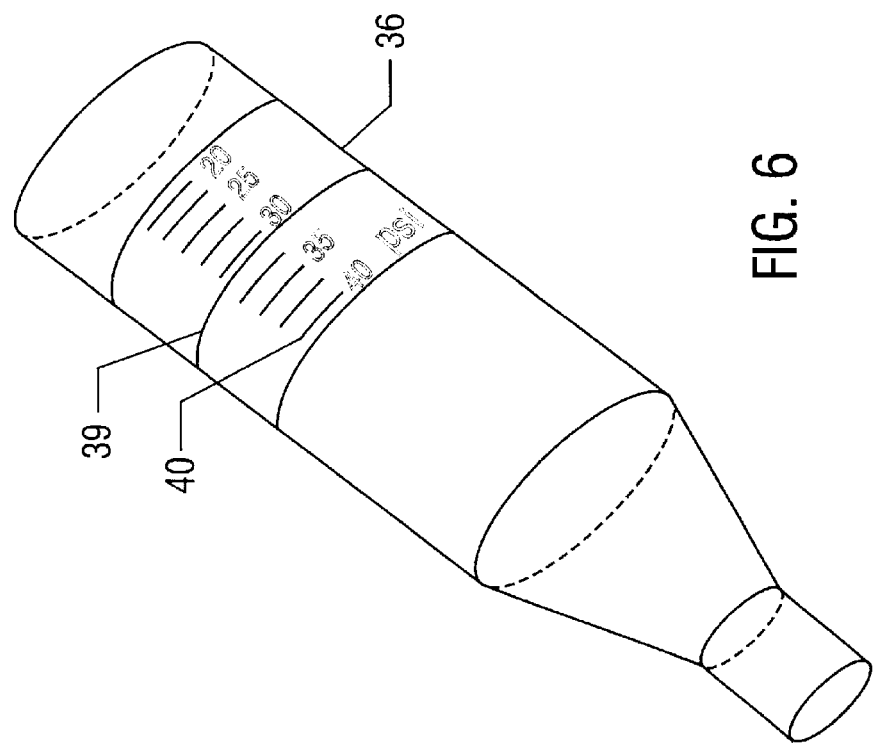
FIG. 6 illustrates an optional air pressure indicator that can be incorporated into the second and third embodiments of the invention. The indicator is comprised of a marker line on a movable part of the internal mechanism and calibrated reference lines on a transparent section of the valve stem.

A variation of this second embodiment employs a transparent monitoring window 36 comprising a section of the valve stem's wall. This is illustrated in FIG. 6. An indicator line or mark 39 is placed on a portion of the movable inner chamber assembly, such as the outer edge of disks 20 or 26, and shows the user by its location or presence whether the tire is properly inflated or whether its pressure is low and it needs air. This indicator assists the user by letting them know when their tire needs air as well as informing them as to when they have achieved proper tire pressure during inflation.

Alternatively, a version of the valve may be manufactured where the transparent window is marked with calibrated reference lines 40 as illustrated in FIG. 6 to allow the indicator to show the exact tire pressure. This version would be manufactured with its tube 2 length and/or spring 5 tension adjusted so as to achieve a pressure release threshold higher than the manufacturer's recommended value. The user can then intentionally over-inflate the tires on a temporary basis. This would be useful, for example, if the user needed to haul a heavy load. Typically, the pressure release valve would be calibrated in this alternative to open at a pressure level higher than the manufacturer's suggested operating pressure but before the tire becomes dangerously over-inflated. Such a built in pressure gauge would allow the user to precisely monitor and adjust the tire's inflation level.

Figure 7:
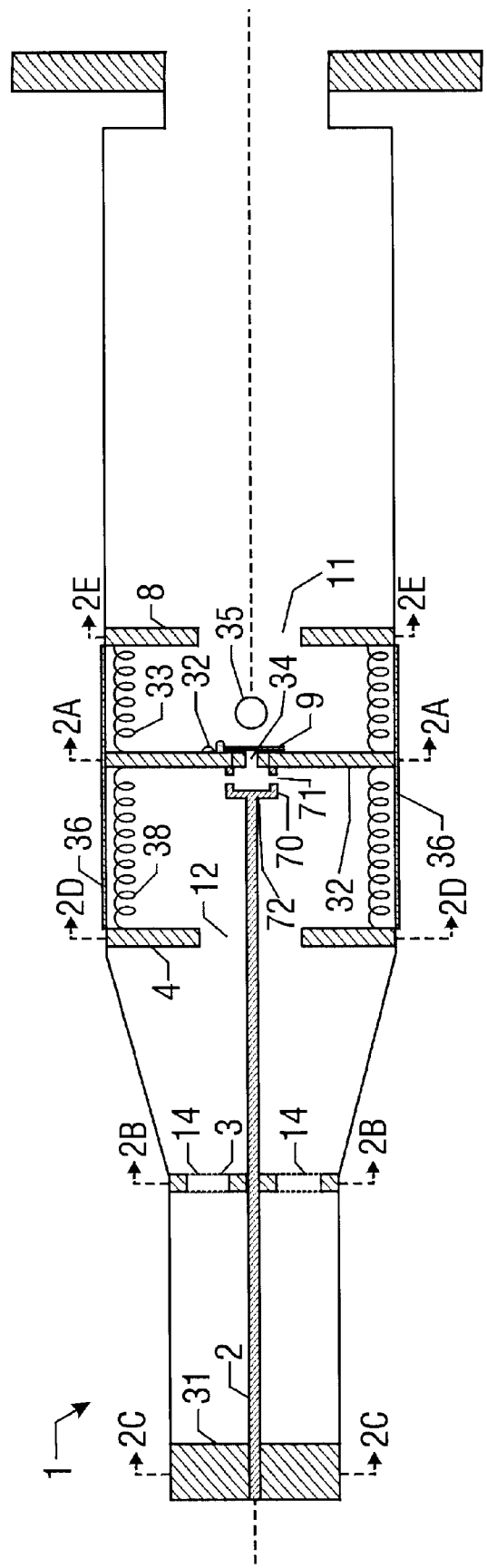
FIG. 7 illustrates a cross-sectional view of the third embodiment of the present invention. This embodiment uses a flap valve in conjunction with a hole bored into the side of the valve stem to regulate the tire's internal pressure and prevent over-inflation.

A third embodiment of the present invention is illustrated in FIG. 7. In this embodiment one or more bleed apertures 35 in the side wall of the valve stem housing 1 are used in conjunction with a one-way flap valve 9 to control the tire's pressure. A thin tube 2 is supported in the center of the valve stem by two support structures, disk 31 and disk 3. Disk 31 consists of spokes or vanes 60 while disk 3 possesses apertures 14. The end of the tube 2 connects to a hole 72 in the face of a cylindrical plenum chamber 70, which in turn is connected to disk 32 possessing a flap valve 9. Alternatively, other one-way valve designs may be used. Disk 32 is identical to disk 7 as shown in FIG. 2 except for the fact that it does not have any apertures. A spring 38 is placed between disks 4 and 32, and another spring 33 is placed between disks 32 and 8. Disks 4 and 8 comprise connected solid supports that are attached or connected to the interior wall of the valve stem housing 1. As with the previous embodiments, disk 32 and the inner surface of the valve stem housing 1 are manufactured to tolerances precise enough to avoid jamming as the disk 32 moves along the longitudinal axis of the valve stem. The tolerances are also precise enough to effectuate a seal between the edge of the disk 32 and the valve stem housing's inner surface. This seal may be augmented by the use of a grease or lubricant.

When the tire is being inflated, air passes through disk 31, apertures 14, hole 12, apertures 71, hole 34, flap valve 9, hole 11, and on into the tire. If the tire has been over-inflated, the tire-side pressure will act upon disk 32 to compress the spring 38 and expose the one or more bleed apertures 35 located in the side wall of the valve stem housing 1. This allows air from the tire to escape through the bleed aperture 35 into the environment. As the tire pressure drops, the force acting upon the disk decreases and the spring 38 is able to push the disk 32 towards the tire. The spring's characteristics are selected such that the disk 32 will just cover the bleed aperture 35 as the tire reaches its recommended inflation pressure. Disk 8 is rigidly connected to the stem's inner surface and braces spring 33. Together they act as shock absorbers to restrict and dampen the motion of disk 32 during inflation. They also function to prevent spring 38 from being excessively extended during inflation, which would undesirably change the pressure threshold at which the bleed aperture would be closed. To deflate the tire, a thin pin (not shown) is inserted down into the central tube 2 and used to push open the flap valve 9.

As with the second embodiment, a variation of this third embodiment allows for a transparent window 36 to form part of the valve stem wall (see FIG. 6). A reference mark or line 39 is placed on the edge of the disk 32 so that its presence or position as seen through the window indicates the inflation level of the tire. In a simple application, the presence or position of the reference mark simply alerts the user to the fact that the tire is under-inflated as well as informs the user as to when proper pressure has been achieved during inflation. However, the window may also be calibrated with lines 40 to indicate the precise tire pressure. If configured to indicate exact tire pressure in this way, then the valve would be manufactured to have a pressure release threshold higher than the recommended level but lower than any danger area in order to allow the user to set whatever tire pressure they want while still protecting against dangerous over-inflation. This would, for example, allow the user to temporarily over-inflate the tire in order to haul heavy loads.

Figure 9:
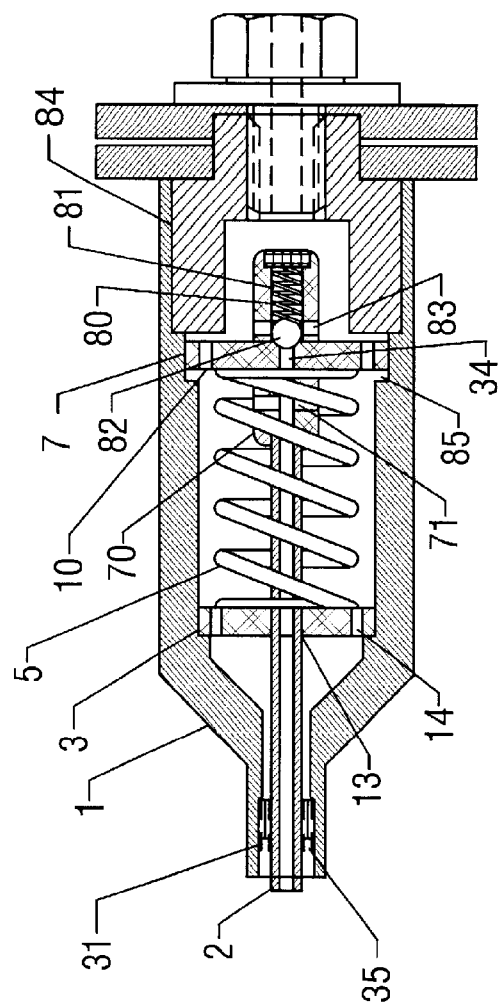
FIG. 9 illustrates a cross-sectional view of the fourth embodiment of the present invention. This embodiment uses a ball valve biased by a spring to regulate air going into the tire and a movable structure with exposable bleed apertures that is biased by a second spring to regulate the release of air out of the tire.

A fourth embodiment is illustrated in FIG. 9. As in the first embodiment (see FIG. 1), this embodiment is designed to be a form fit replacement for existing commercial valve stems and uses a movable disk 7 possessing bleed apertures 10 and a biasing spring 5 to regulate the pressure inside of the tire. The spring is placed between disk 7 and a second disk 3. Disk 3 is rigidly connected to the inner surface of the valve stem housing 1 and possesses both a hole at or near its center 13 as well as apertures in its surface 14 as seen in FIG. 2B. A thin centrally-mounted hollow tube 2 extends through disk 31's central hole 62. Disk 31 is affixed to the inner surface of the valve stem housing 1 and, as seen in FIG. 2C, consists of radial spokes or vanes 60 that enable it to generate a whistling sound as air rushes in or out of the tire. The tube 2 is also supported by disk 3 as it runs through its central hole 13. The tube 2 terminates into a hollow cylindrical plenum chamber 70 (FIG. 8) which possesses one or more apertures 71 on its surface. The end of the cylindrical plenum chamber 70 opposite the tube 2 is rigidly connected to movable disk 7. On the opposite side of disk 7 is a one-way ball valve comprised of a hollow cylindrical housing 80 containing a second spring 81 and a ball 82. There are also apertures 83 in the sides of the housing 80. The ball 82 may be constructed of metal or plastic and may have a rubbery surface coating or other sealing material in order to help effectuate a seal with the central hole 34 of movable disk 7. Alternatively, other one-way valve designs may be used.

During tire inflation, air first passes through disk 31 at the end of the valve stem housing 1. Incoming air then passes through the apertures 14 of disk 3. The air next enters the cylindrical plenum chamber 70 via its apertures 71 and then passes through the central hole 34 of movable disk 7. The pressurized air exerts a force on ball 82 thus compressing spring 81 and revealing apertures 83. The incoming air passes through these exposed apertures 83 and continues through the rear of the valve stem housing 84 and on into the tire. If the tire is over-inflated, the tire pressure acting upon disk 7 compresses the spring 5 and pushes the disk 7 away from the rear of the valve stem housing 84. This reveals disk 7's bleed apertures 10 and allows air from the tire to pass through them and on out of the valve. The spring 5 is selected and pre-loaded such that disk 7 just becomes flush with the rear valve stem housing 84 as the recommended tire pressure is reached. This serves to seal off disk 7's bleed apertures 10 and prevents the loss of any more tire pressure. Both disk 7 and the portion of the rear valve stem housing 84 facing disk 7 may have rubbery coatings or other sealing materials to improve their ability to form an air tight seal. Disk 7 is positioned between a ridge 85 in the valve stem housing 1 and the rear of the housing 84. This limits the travel of the movable disk 7 and thus helps to minimize the amount of tire pressure released during instantaneous pressure rises caused by running over curbs and rocks.

Figure 10:
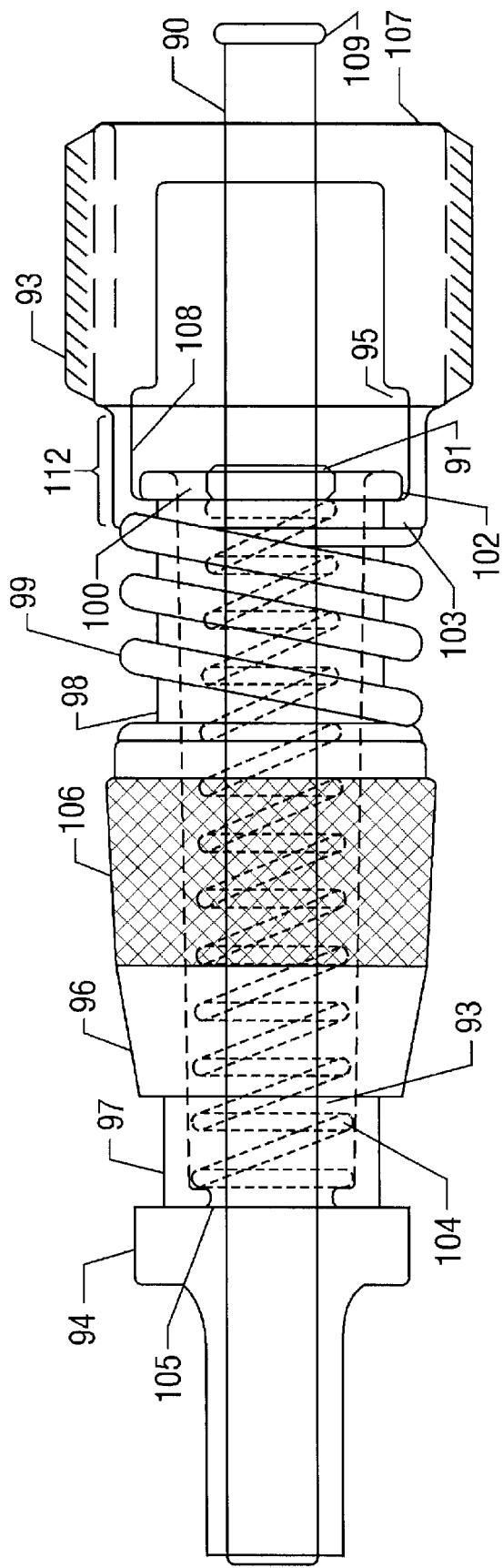
FIG. 10 illustrates a cross-sectional view of the fifth embodiment of the present invention. This embodiment uses a needle valve biased by a spring to regulate air going into the tire and a plunger biased by a second spring to regulate the release of air out of the tire.
Figure 11:
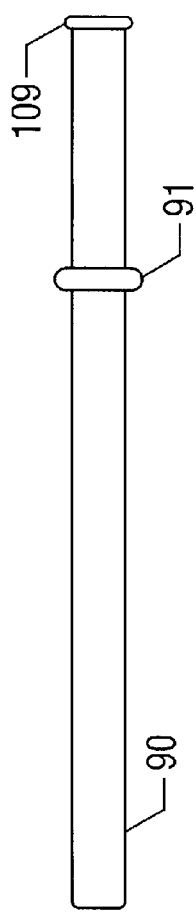
FIG. 11 illustrates the center pin that runs longitudinally through the fifth embodiment of the present invention.
Figure 12:
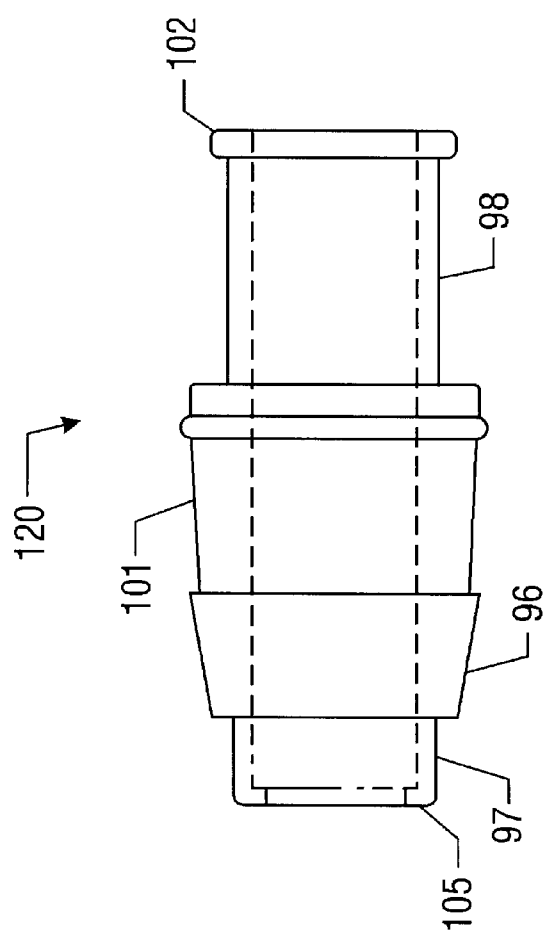
FIG. 12 illustrates the plunger which is used to create a seal with the inner valve stem housing wall, or a shoulder or ridge cut into the inner wall, in the fifth embodiment of the present invention.
Figure 13B:
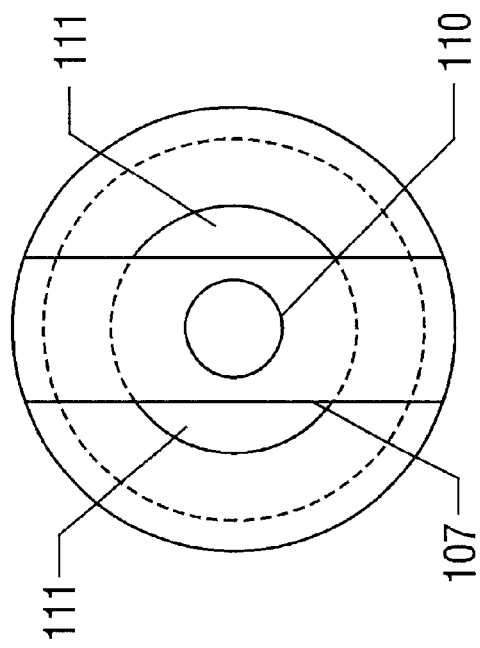
FIG. 13 illustrates the base of the fifth embodiment of the invention. The base in threaded and screws into the valve stem housing, thus supporting the mechanism within the valve stem.
Figure 13A:
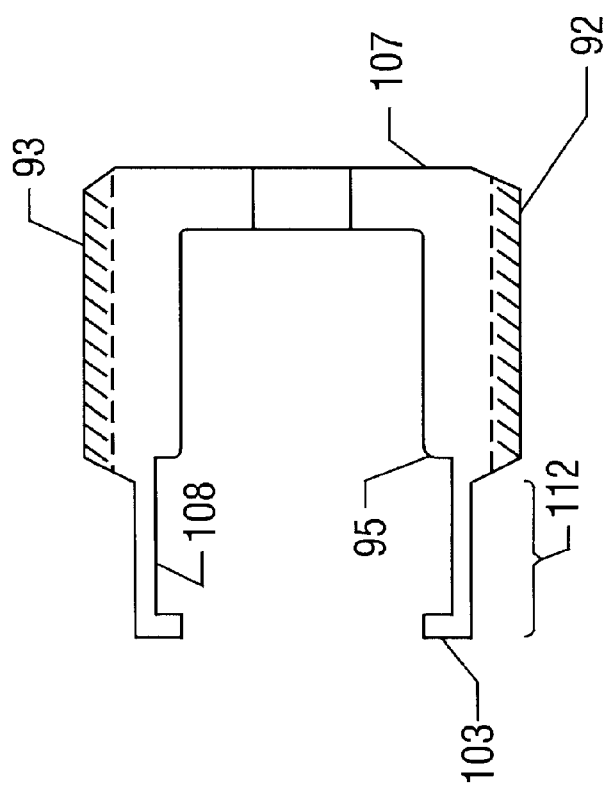

A fifth and final embodiment of the present invention is illustrated in FIGS. 10. through 13. This embodiment comprises a valve stem mechanism that can be screwed into existing valve stems. Running through the center of the mechanism is a pin 90 with a raised outer flange 109 at one end and a second raised outer flange 91 between the pin's two ends. Wrapped around this pin 90 and braced against flange 91 is a spring 104. Rigidly affixed around one end of the pin 90 is an end-cap 94. Placed around the spring 104 is a plunger assembly 120 comprising a plunger body 96 and two end-shafts 97 and 98. At the end of end-shaft 97 is an inner flange 105, while at the end of end-shaft 98 there is an outer flange 102. There exists a recess 101 in the plunger body into which is placed a ring of rubber or plastic material 106. The end of the spring 104 opposite the pin's outer flange 91 is braced by the inner flange 105 of end-shaft 97. Alternatively, the spring 104 may be braced by a taper applied to the interior wall of end-shaft 97.

Placed around the end of the pin 90 opposite the end-cap 94 is a base 92. The base 92 consists of a hollow cylindrical region 112 affixed to a U-shaped cross-member 107 possessing a central hole 110. The cross-member 107 of the base 92 is threaded 93 to allow it to screw into existing valve stems. The placement of the cross-member 107 on the cylindrical region 112 of the base results in the creation of two bleed apertures 111 in the base 92. The pin 90 is suspended through the central hole 110 of the cross-member 107 and is not rigidly affixed to said cross-member. The diameter of the hole 110 is greater than that of the pin 90 but less than that of the pin's end-flange 109. This arrangement keeps the pin 90 positioned through the center of the base 92 and allows it to move relative to the longitudinal axis of said base without sliding all the way through the hole 110. The inner wall of the cylindrical region 112 of the base has a valley 108 bounded at one end by an inner flange 103 and on the other end by a ridge 95 created by the inner surface of the cross-member 107. The base is positioned around the pin 90 such that the outer flange 102 of end-shaft 98 is free to move along the pin's longitudinal axis within the valley 108 formed by the base's inner flange 103 and the ridge 95. Finally, placed around the end-shaft 98 of the plunger assembly 120 between the plunger body 96 and the base's inner flange 103 is a second spring 99.

When the fifth embodiment is screwed down into a standard valve stem, the plunger 96 makes circumferential contact with the inner wall of the valve stem thus forming a seal. The plastic or rubber ring 106 around the plunger body 96 is designed to help effectuate such a seal. During tire inflation, an inflator (not shown) is pushed against the base 92. This compresses spring 104 and pushes the pin 90 towards the tire together with the affixed end-cap 94. This creates an opening between said end-cap 94 and the inner flange 105 of the plunger assembly's 120 end-shaft 97. Incoming air moves from the inflator, through the base's 92 bleed apertures 111, through the space 100 between the pin 90 and the plunger assembly 120, through the gap between the end-cap 94 and the end-shaft's 97 inner flange 105, and on into the tire. When the inflator is removed, the spring 104, braced by the end-shaft's 97 inner flange 105 pushes the pin 90 back away from the tire until the end-cap 94 once again makes contact and forms a seal with the end-shaft 97.

Air pressure in the tire acts upon the plunger body 96 that is forming a seal with the inner wall of the valve stem. If the tire has been over-inflated, these air pressure forces will push the plunger assembly 120 away from the tire and towards the base 92 and thus compress the spring 99. As the plunger assembly 120 moves towards the base 92, the plastic or rubber ring 106 around the plunger body 96 will eventually lose contact with the inner wall of the valve stem and thus break the seal. This happens because the inner diameter of standard valve stems (not shown) taper so that their inner diameter gets larger as one moves up the stem away from the tire. With the seal broken, air will exit the tire through the gap created between the ring 106 of the plunger body 96 and the inner wall of the valve stem. This air will then move through the base 92 and out through the bleed apertures 111. Just as the pressure reaches its recommended value, the spring 99 will have extended far enough to reseat the ring 106 against the inner wall of the valve stem thus reforming the seal and preventing the loss of any more tire pressure.

The fifth embodiment can also support the inclusion of a whistle-generating device (not shown) so as to audibly alert the user when air is exiting the tire. Such a device may be similar to disk 31 (FIG. 2) and possess vanes, spokes, balls or other aerodynamic structures for the generation of the sound. The disk could be placed in the valley 108 of cylindrical portion 112 of the base 92 adjacent to the ridge formed by the cross-member 107. The movement of the plunger assembly 120 along the longitudinal axis of the pin 90 is restricted by the inner flange 103 and ridge 95 within the base. This prevents the valve from opening too far during sudden pressure rises caused by rolling over rocks, curbs, or other objects.

As illustrated in FIG. 14, the flared and elongated base 121 for the fifth embodiment will allow this embodiment to be screwed, for example, by threads on its outer surface 122, into an existing valve stem core housing, or one modified to have a solid support cut into its inner wall, so that the plunger/O-ring assembly will form an air-tight seal and release air when the tire's internal pressure exceeds its preselected value.

This flared base 121 will allow the user to install the fifth embodiment without having to make any adjustments in order to get an air-tight seal or to make it release air at a pre-selected p.s.i. It will simply screw into the valve stem core housing the same way as an existing Shrader valve core. The user will simply screw in the fifth embodiment until it stops.

Figure 15:
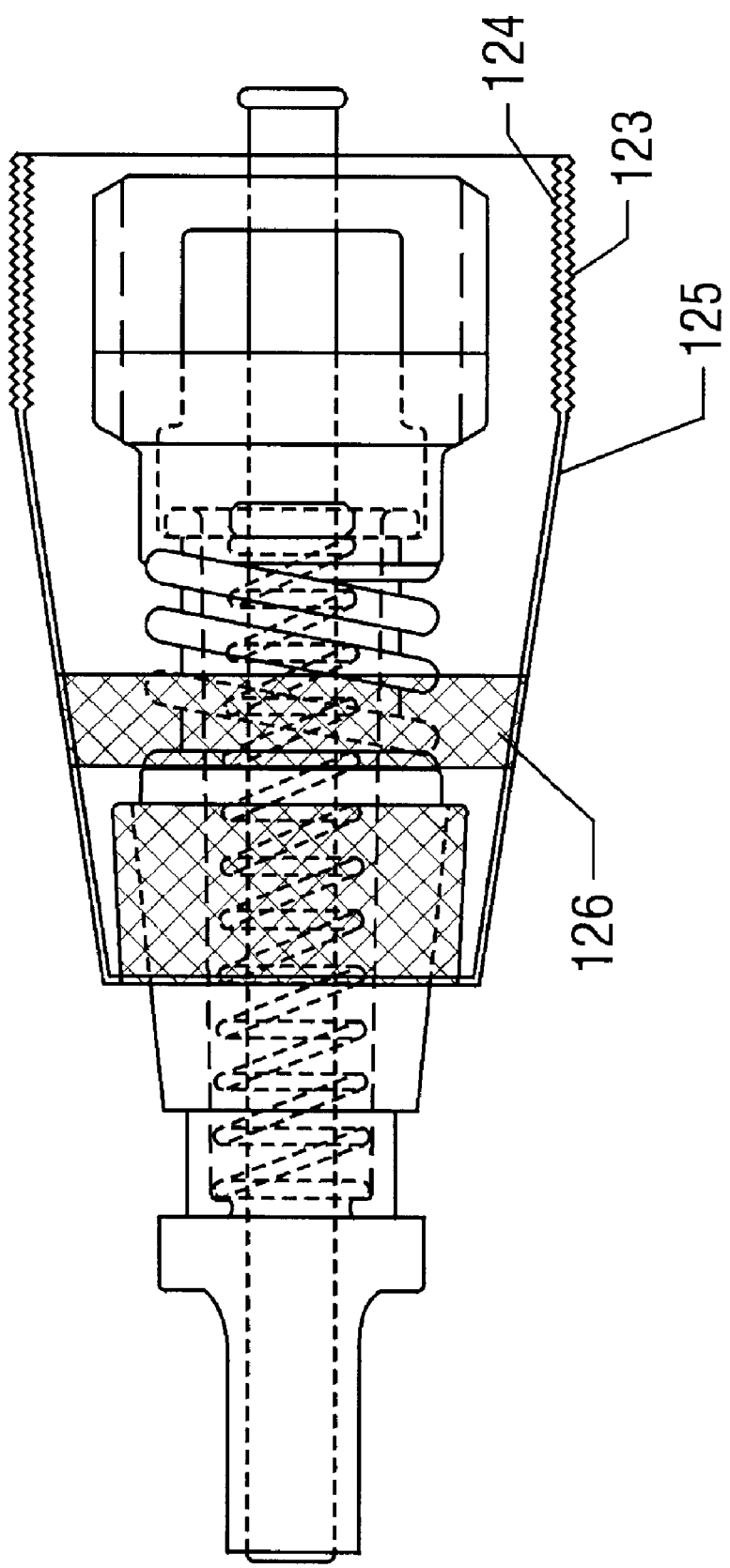
FIG. 15 illustrates the cut away view of a conical shaped housing for a scaled down version of the fifth embodiment.

The conical shaped housing 125 illustrated in FIG. 15 will screw down into an existing valve stem core housing by virtue of threads on its outer surface 123. It hosts a rubber or plastic ring 126 and a solid support with a positive, air-tight, seal at the narrow end. The conical shaped housing 125 may support either a two-way pressure regulating valve built in as part of the housing or a scaled down version of the fifth embodiment. The conical shaped housing 125 may be threaded on its inner surface 124 to allow the fifth embodiment core to be screwed into it. Alternatively, the conical shaped housing 125 may comprise an integral part of the fifth embodiment.

Figure 16:
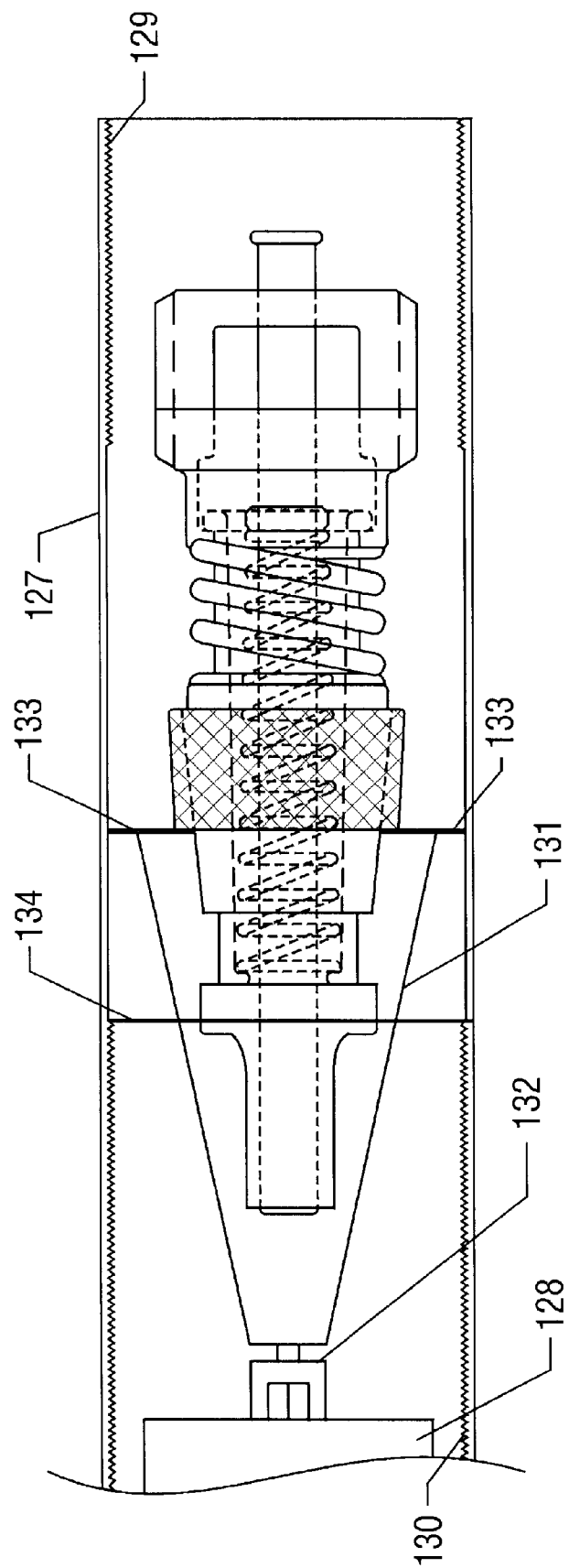
FIG. 16 illustrates the cut away view of an end cap use of a modified fifth embodiment.

Illustrated in FIG. 16 is the fifth embodiment modified to be included in an end cap 127 for use with an existing, commercially available valve stem core and housing 128. The end cap 127 is connected to the valve stem core and housing 128, for example, by threads on the inner surface of the end cap 130. The fifth embodiment is connected to the end cap 127, for example, by being screwed into threads on the inner surface 129 of the end cap.

The end cap may also include a conical shaped structure 131 to facilitate the spacing of the fifth embodiment relative to the pin 132 of the valve stem core and to continuously depress the pin 132 of the valve stem core at the same time inner sealing ring 134, which may comprise a rubbery material, makes an airtight seal with the top of the valve stem. The O-ring of the fifth embodiment forms an airtight seal with a solid support 133, which is connected to the end cap, and may be part of the conical structure 131. Alternatively, a solid support may be used to depress the pin, instead of the conical structure.

A modification of a Shrader valve stem core housing allows the fifth embodiment, without the elongated base, to screw into the housing and stop itself at the same time the plunger/O-ring assembly makes an air-tight seal with the solid support. In this embodiment, the inner threading of an existing valve stem core housing is shortened so that the fifth embodiment screws in an exact, desired amount.

EXAMPLE 1

A prototype of the fifth embodiment was constructed using a plastic, grommet shaped, O-ring on the plunger assembly. While this core was able to release air from the tire when it was over-inflated, the plastic O-ring was unable to form an effective seal with the inner conical shaped wall of the valve stem core housing. This plastic, grommet shaped O-ring was replaced with a standard rubber O-ring.

The rubber O-ring did allow for inflation and did release air when the tire was over-inflated. However, once it sealed at the desired air pressure, the plunger would not dislodge from the inner wall of the valve stem core housing. This prototype was tested on an automobile tire. It was noted that in town and short distance driving caused the pressure in the tires to increase between two and four p.s.i.

After test driving, a slight modification was made to the inner wall of the valve stem core housing to alleviate this problem. Although the inventors contemplate that this problem may also be overcome without modifying the inner wall of the valve stem core housing. Specifically, a flat edged drill was used to cut a shoulder into an existing valve stem core housing. Once this was accomplished, the core housing was mounted onto a standard tire and tested.

This prototype worked to release excess pressure from an over-inflated tire until the desired air pressure within the tire was reached. These test results were repeated and confirmed numerous times. This prototype was then tested on a car. Once the tire was mounted, it was over-inflated and the prototype released air until the tire achieved the desired p.s.i.

The inventors contemplate that the spring may be set for a specific p.s.i. using either a flared top to the base (a "halo"), a bullet shaped housing for a scaled down fifth embodiment, or modified threads in an existing Shrader valve stem core housing. The user or installer will simply screw in the plunger/O-ring assembly the same way that they screw in an existing core.

The prototype was then test drove on hot Texas highways in August. The car including the tire having the prototype was driven from Austin to Houston. It was found on this trip that this embodiment of the invention did not release any air. However, the air pressure in the tires actually only increased two pounds in pressure because of the cooling effect caused by the envelope of air that often surrounds an automobile travelling on the highway as explained by Smithers Scientific, a firm that does road testing for the tire industry.

It has also been discovered that due to spring technology, and improvements in rubbers and plastics, valve mechanisms, such as the fifth embodiment, can be manufactured to exact specifications. Further, there is at least one spring manufacturer, Leeco of Houston, Tex. that will be able to provide springs that will begin releasing air at either one or three pounds over the desired pressure both when the tire is first inflated and when driving on the road. This feature will allow consumers and manufacturers to decide how they want their air release system to work. For example, some tires have a recommended value of 32 p.s.i. The valve stem core of the invention may be selected to release air at 33 p.s.i. or when the tire through road friction increases in pressure more than 10% over the recommended value, or 36 p.s.i. Either option is easily manufactured.

EXAMPLE 2

Certain aspects encompass a tire stem valve mechanism for automatically controlling the internal pressure of a tire comprising:
  a) a pin having a first end and a second end, said pin comprising:
    ix) an end-cap connected at the first end;
    ii) a first raised outer flange at the second end; and
    iii) a second raised outer flange positioned between the first end and second end;
  b) a first pressure-sensitive structure having a first end and a second end, said pressure-sensitive structure located proximal to the pin, wherein the second end of the first pressure-sensitive structure is braced by said second raised outer flange;
  c) a plunger assembly having a first end and a second end, said plunger assembly located proximal to the first pressure-sensitive structure and capable of moving along a longitudinal axis of said pin in response to an increase or decrease in the internal pressure of the tire, wherein the first end of the first pressure-sensitive structure is braced by said first end of the plunger assembly;
  d) a base having a first end and a second end, said base located proximal to the second end of the pin, wherein the base is at least partially threaded and has one or more wings connected to one end; and
  e) a second pressure-sensitive structure proximal to the base and braced at one end by the plunger assembly, wherein the second pressure-sensitive structure pushes against the plunger assembly to create an air tight seal at the plunger when the internal pressure of the tire is at or below a pre-selected value.

Another aspect encompasses a cap for a tire stem valve core and housing having a first and second end and an interior and exterior surface comprising:

a) a tire stem valve mechanism connected to the interior surface of the cap proximal to the first end, b) a first solid support connected to the interior surface of the cap between said first and second ends thereby forming an airtight seal with the plunger assembly, c) a second solid support connected to the inner surface proximal to said second end; and d) a sealing ring connected proximal to the second end of the cap thereby forming an airtight seal with the tire stem valve mechanism when the pin of the tire stem valve core is depressed.

The first and second solid support may optionally comprise part of a conical structure. In these embodiments, air inflation and release may be effectuated without removal of the cap from the tire stem valve core and housing Another embodiment encompasses a valve stem housing having a tire-side end and an inflation-side end comprising: a cylindrical valve stem housing having inner threads and modified to contain a first and second shoulder, wherein (i) the first shoulder is located proximal to the inflation-side end of the valve stem housing along the inner threads of the valve stem housing and is adapted to abut one or more wings connected to an end of an at least partially-threaded base of a tire stem valve mechanism when the tire stem valve mechanism is screwed into the valve stem housing to the desired depth; and (ii) the second shoulder is located proximal to the tire-side end of the valve stem housing and adapted to form an airtight seal with the tire stem valve mechanism when the tire stem valve mechanism is screwed into the valve stem housing to the desired depth.

In these embodiments, the shoulder may be connected or affixed in anyway to the valve stem housing. Thus, the shoulder may, for example, be cut or manufactured into, integral with, or physically attached to the housing. These aspects also encompass a tire stem valve mechanism having one or more wings that is screwed into the inner threads of the valve stem. Typically, the second pressure-sensitive structure is set to the pre-selected value when the tire stem valve mechanism is screwed into the desired depth. The claimed valve stem housing, with or without the tire stem valve mechanism, may be adapted for use as, or in the form of, a cap that screws onto a conventional tire stem housing, valve and core, such as a Shrader valve stem and core. In these embodiments, it is not necessary to remove the cap during air inflation and release.

For embodiments employing an O-ring, the pressure-sensitive structure that allows for air release may be in contact, directly or indirectly, with the O-ring such that the O-ring moves along the longitudinal axis toward the inflation-side end of the valve stem when the internal pressure of the tire exceeds a desired value creating an aperture through which excess air escapes. This typically does not require the O-ring to be physically connected to that pressure-sensitive structure, nor is such a physical connection preferred.

Figure 18:
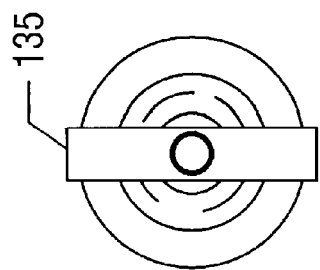
FIG. 18 illustrates the wing design on the threaded base as it would appear looking down the valve stem mechanism in a valve stem.
Figure 17:
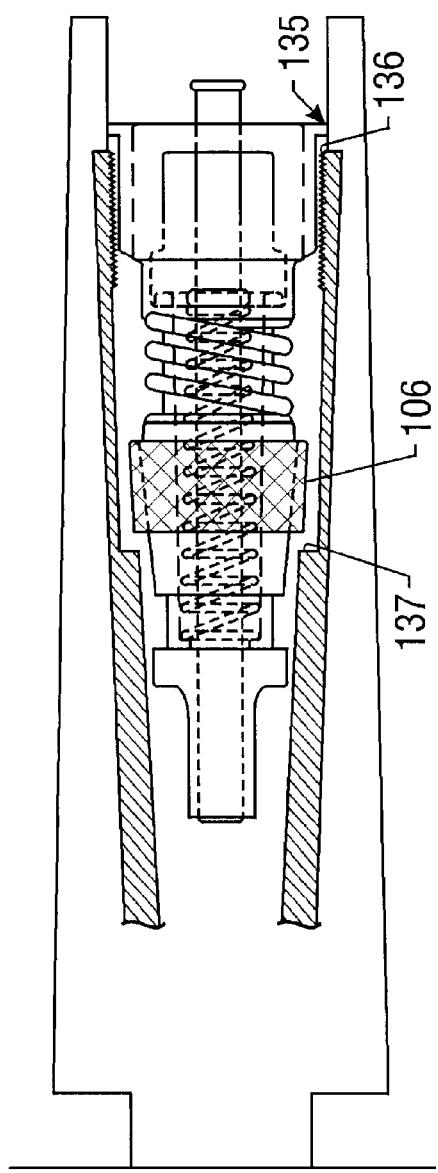
FIG. 17 illustrates a cut away view of the wing design for the threaded base. It also shows a cut away view of how the fifth embodiment will work in a valve stem that has been modified to contain two shoulders.

FIG. 17 and FIG. 18 illustrate an example of the fifth embodiment. A standard valve stem is manufactured or modified to contain two shoulders: 136 located proximal to the inflation-side end and 137 located proximal to the tire-side end. These shoulders are positioned so that when a partially- or fully-threaded base of the fifth embodiment is screwed into the valve stem to the desired depth, one or more wings 135 connected to the threaded base will abut the shoulder 136 at the same time the O-ring 106 forms an airtight seal with the second shoulder 137. The shoulders 136 and 137 are positioned such that the base may not be screwed further into the valve stem than the desired depth. This desired depth depends on the second pressure-sensitive structure and the pre-selected value, or desired tire pressure. Thus, in some aspects, the shoulders 136 and 137 are positioned such that the abutting or coming into contact of the one or more wings 135 and the O-ring 106 with the shoulders 136 and 137, respectively, thereby stops the threaded base from being further screwed into the valve stem. At this point, the second pressure-sensitive structure of the fifth embodiment is compressed enough to cause the O-ring 106 to seal against shoulder 137 when the internal pressure of the tire is at or below the desired air pressure, or the pre-selected value.

All of the compositions and methods disclosed and claimed herein can be made and executed without undue experimentation in light of the present disclosure. While the compositions and methods of this invention have been described in terms of preferred embodiments, it will be apparent to those skilled in the art that variations may be applied to the compositions and methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A tire stem valve for automatically controlling the internal pressure of a tire comprising:

a) a hollow cylindrical valve stem housing having a longitudinal axis, a tire-side end and an inflation-side end comprising at least one opening through which air both enters and exits the hollow cylindrical valve stem housing;

b) a one-way valve for inflating the tire;

c) a movable disk contained within the valve stem core housing and capable of moving along the longitudinal axis in response to an increase or decrease in the internal pressure of the tire, said disk effectuating a substantially air-tight seal when the tire pressure is at or below the desired value;

d) a first pressure-sensitive structure located within the valve stem core housing and positioned between the movable disk and a first solid support structure, wherein said first solid support is immovably connected to the valve stem core housing at the inflation-side end and wherein said pressure-sensitive structure extends and contracts in response to the internal pressure of the tire acting on the movable disk; and e) one or more bleed apertures that allow air to exit said stem valve housing through the inflation-side end when air pressure inside the tire exceeds a desired value;

wherein when the movable disk is not an O-ring, the valve stem further comprises a centrally-mounted tube running parallel to the longitudinal axis of the valve stem core housing from the inflation-side end of the valve stem core housing to a plenum chamber affixed to the movable disk.

2. The tire stem valve of claim 1, wherein the first pressure-sensitive structure is a spring, rubber, a polymer, or a foam.

3. The tire stem valve of claim 1, wherein the movable disk has at least one bleed aperture through its surface.

4. The tire stem valve of claim 1, further comprising a second solid support connected to the valve stem core housing positioned to create an air-tight seal with the movable disk when said disk is pushed against said second solid support by the first pressure-sensitive structure.

5. The tire stem valve of claim 4, wherein the second solid support comprises an integral part of the valve stem core housing.

6. The tire stem valve of claim 1, wherein the moveable disk comprises an O-ring.

7. The tire stem valve of claim 6, wherein the aperture comprises a gap between the O-ring and the second solid support.

8. The tire stem valve of claim 4, wherein the first pressure-sensitive structure comprises a spring.

9. The tire stem valve of claim 4, further comprising a transparent window in the valve stem core housing.

10. The tire stem valve of claim 9, wherein the window comprises at least one reference mark.

11. The tire stem valve of claim 2, wherein the one-way valve comprises a ball valve.

12. The tire stem valve of claim 11, wherein the ball valve comprises a ball, a cylindrical housing having apertures, and a spring.

13. The tire stem valve of claim 11, wherein the movable disk has at least one bleed aperture through its surface.

14. The tire stem valve of claim 1, further comprising a second solid support connected to the valve stem core housing and positioned so as to create an air-tight seal with the movable disk when said disk is pushed against said solid support by the first pressure-sensitive structure.

15. The tire stem valve of claim 14, wherein the first pressure-sensitive structure comprises a spring.

16. The tire stem valve of claim 1, further comprising an audible whistle that operates when air enters or exits the tire stem valve.

17. The tire stem valve of claim 16, wherein the audible whistle is comprised of a rigid disk located within the valve stem core housing having aerodynamic features which generate a whistling sound when air passes through the disk.

18. The tire stem valve of claim 17, wherein the whistle generating aerodynamic features are comprised of spokes, vanes, or balls.

19. A tire valve stem mechanism comprising a Shrader valve stem having a longitudinal axis, a tire-side end and an inflation-side end, a modified valve stem core, and a Shrader valve stem housing having an inner wall wherein said core has been modified to include a calibrated pressure-sensitive structure, an O-ring, said O-ring forming an air-tight seal with the inner wall of the valve stem when seated against the inner wall, wherein the O-ring is movable along the longitudinal axis of the valve stem in response to an increase or decrease in the internal pressure of the tire, and wherein the pressure sensitive structure is proximal to the O-ring such that the O-ring moves along the longitudinal axis toward the inflation-side end of the valve stem when the internal pressure of the tire exceeds a desired value creating an aperture through which excess air escapes.

20. The tire stem valve of claim 19, wherein said modified valve stem core further comprises:

a plunger assembly having a tire-side end and an inflation-side end, wherein the plunger assembly is proximal to said O-ring and the pressure-sensitive structure and comprises a base at the inflation-side end; and wherein air travels through the base during air inflation and release.

21. The tire stem valve of claim 20, wherein air travels around the plunger assembly during release and through the plunger assembly during inflation.

22. A tire stem valve mechanism for automatically controlling the internal pressure of a tire comprising:

a) a pin having a first end and a second end, said pin comprising:
  i) an end-cap connected at the first end;
  ii) a first raised outer flange at the second end; and
  iii) a second raised outer flange positioned between the first end and second end;

b) a first pressure-sensitive structure having a first end and a second end, said pressure-sensitive structure located proximal to the pin, wherein the second end of the first pressure-sensitive structure is braced by said second raised outer flange;

c) a plunger assembly having a first end and a second end, said plunger assembly located proximal to the first pressure-sensitive structure and capable of moving along a longitudinal axis of said pin in response to an increase or decrease in the internal pressure of the tire, wherein the first end of the first pressure-sensitive structure is braced by said first end of the plunger assembly;

d) a base having a first end and a second end, said base located proximal to the second end of the pin, wherein the base is at least partially threaded and has one or more wings connected to one end; and e) a second pressure-sensitive structure proximal to the base and connected at one end against the plunger assembly, wherein the second pressure-sensitive structure pushes against the plunger assembly to create an air tight seal at the plunger when the internal pressure of the tire is at or below a pre-selected value.

23. The tire stem valve mechanism of claim 22, wherein the second pressure sensitive structure comprises a spring having an inflation-side end and a tire-side end.

24. The tire stem valve mechanism of claim 23, wherein the plunger assembly braces the tire-side end of the spring and the base braces the inflation-side end of the spring.

25. The tire stem valve mechanism of claim 22, wherein the plunger assembly further comprises a plunger body and one or more end-shafts.

26. The tire stem valve mechanism of claim 25, wherein the plunger assembly further comprises an O-ring positioned around the plunger body.

27. The tire stem valve mechanism of claim 22, wherein the base further comprises a U-shaped cross-member and a tire-side member defining a hollow cylindrical portion.

28. The tire stem valve mechanism of claim 27, wherein a ridge is formed at the junction of the member defining the hollow cylindrical portion of the base with the U-shaped cross-member.

29. The tire stem valve mechanism of claim 28, wherein the hollow cylindrical portion of the base comprises both an inner flange at its first end and a recessed valley between said inner flange and the ridge formed by the junction with the cross-member.

30. The tire stem valve mechanism of claim 29, wherein said plunger assembly further comprises an end shaft having a first end and a second end, said end shaft connected to the second end of the plunger assembly.

31. The tire stem valve mechanism of claim 30, wherein the plunger end-shaft comprises an outer flange at its second end, said outer flange being able to move longitudinally within said recessed valley, said outer flange limiting movement of the plunger assembly.

32. The tire stem valve mechanism of claim 31, further comprising a calibrated spring positioned around the plunger end shaft and braced on one end by the plunger and on the other end by the inner flange of the threaded base.

33. The tire stem valve mechanism of claim 32, wherein the U-shaped cross-member comprises a hole substantially at its center.

34. The tire stem valve mechanism of claim 22, further comprising an audible whistle comprised of a rigid disk located within the hollow cylindrical portion of the base.

35. The tire stem valve mechanism of claim 34, wherein said rigid disk comprises reeds, spokes, vanes, or balls.

36. A cap for a tire stem valve core and housing having a first and second end and an interior and exterior surface comprising:
   a) the tire stem valve mechanism of claim 20 connected to the interior surface of the cap proximal to the first end,
   b) a first solid support connected to the interior surface of the cap between said first and second ends thereby forming an airtight seal with the plunger assembly,
   c) a second solid support connected to the inner surface proximal to said second end; and
   d) a sealing ring connected proximal to the second end of the cap thereby forming an airtight seal with the tire stem valve mechanism when the pin of the tire stem valve core is depressed.

37. The cap of claim 36, wherein said first and second solid support comprise part of a conical structure.

38. A valve stem housing having a tire-side end and an inflation-side end comprising: a cylindrical valve stem housing having inner threads and modified to contain a first and second shoulder, wherein
   a) the first shoulder is located proximal to the inflation-side end of the valve stem housing along the inner threads of the valve stem housing and is adapted to abut one or more wings connected to an end of an at least partially-threaded base of a tire stem valve mechanism when the tire stem valve mechanism is screwed into the valve stem housing to the desired depth; and
   b) the second shoulder is located proximal to the tire-side end of the valve stem housing and adapted to form an airtight seal with the tire stem valve mechanism when the tire stem valve mechanism is screwed into the valve stem housing to the desired depth.

39. The valve stem housing of claim 38, wherein said housing comprises a cap for a valve stem.

40. The valve stem of claim 38 further comprising a tire stem valve mechanism of claim 22 screwed into the inner threads of the valve stem.

41. The valve stem of claim 40, wherein the second pressure-sensitive structure is set to the pre-selected value when the tire stem valve mechanism is screwed into the desired depth.

42. The valve stem housing of claim 40, wherein said housing comprises a cap for a valve stem.

43. An improved tire stem valve mechanism of the type capable of being screwed into a conventional valve stem housing having an inner wall, said mechanism having a longitudinal axis and a needle valve biased by a first pressure-sensitive structure, wherein the improvement comprises:
   a) a second pressure sensitive structure;
   b) a plunger assembly movable along the longitudinal axis of the tire stem valve mechanism, wherein said plunger assembly is biased by the second pressure sensitive structure to permit the creation of an aperture through which excess air escapes when the internal pressure of the tire exceeds a pre-selected value; and
   c) an O-ring, wherein the O-ring forms an air tight seal between the plunger assembly and the inner wall of the conventional valve stem housing when the internal pressure of the tire is at or below the pre-selected value.

44. The improved tire stem valve mechanism of claim 43, wherein the mechanism is designed to form an air tight seal with the inner wall of a conventional valve stem housing that has been modified.

45. The improved tire stem valve mechanism of claim 44, wherein the conventional valve stem housing has been modified to have an inner wall comprising one or more shoulders.

46. The improved tire stem valve mechanism of claim 44, wherein the conventional valve stem housing has been modified to have an inner wall comprising one or more ridges.

47. The improved tire stem valve mechanism of claims 43 or 44 wherein the tire stem valve mechanism comprises a Shrader tire stem valve.

48. The improved tire stem valve mechanism of claim 43, further comprising a base proximal to the second pressure sensitive structure, said base having a first end and a second end and wherein the base has one or more wings connected to one end.

49. The improved tire stem valve mechanism of claim 43, further comprising an audible whistle which operates when air is released from the tire.

50. A tire stem valve mechanism for automatically controlling the internal pressure of a tire comprising:
   a) a needle valve comprising a pin and a first pressure-sensitive structure, wherein the pin is biased by the first pressure sensitive structure;
   b) a plunger assembly having a first end and a second end, said plunger assembly being capable of moving along a longitudinal axis of said pin in response to an increase or decrease in the internal pressure of the tire;
   c) a base located proximal to the pin, said base having a first end and a second end and one or more apertures wherein air travels through the apertures during inflation and release; and
   d) a second pressure-sensitive structure proximal to the base and braced at one end against the plunger assembly, wherein the second pressure-sensitive structure pushes against the plunger assembly to create an air tight seal at the plunger when the internal pressure of the tire is at or below a pre-selected value.

51. The tire stem valve mechanism of claim 50, wherein the base further comprises one or more wings connected to one end.

52. The tire stem valve mechanism of claim 51, wherein the base is at least partially threaded.

53. The tire stem valve mechanism of claim 50, wherein the plunger assembly further comprises an O-ring positioned around the plunger body.

54. The tire stem valve mechanism of claim 50, wherein the mechanism is designed to screwed into a conventional valve stem housing having an inner wall, and wherein the mechanism forms an air tight seal with the inner wall of the valve stem housing.

55. The improved tire stem valve mechanism of claim 54, where in the inner wall of the conventional valve stem housing has been modified.

56. The improved tire stem valve mechanism of claim 55, wherein the inner wall of the conventional valve stem housing has been modified to comprise one or more shoulders.

57. The improved tire stem valve mechanism of claim 55, wherein the inner wall of the conventional valve stem housing has been modified to comprise one or more ridges.

58. The improved tire stem valve mechanism of claims 50 or 54 wherein the tire stem valve mechanism comprises a Shrader tire stem valve.

59. The tire stem valve mechanism of claim 50, further comprising an audible whistle which operates when air is released from the tire.

60. The tire stem valve mechanism of claim 59, wherein the base further comprises a tire-side member defining a hollow cylindrical portion and the audible whistle is comprised of a rigid disk located within the hollow cylindrical portion of the base.

61. The tire stem valve mechanism of claim 60, wherein the rigid disk comprises reeds, spokes, vanes or balls.

* * * * *